(12) United States Patent
Norita et al.

(10) Patent No.: US 7,925,060 B2
(45) Date of Patent: Apr. 12, 2011

(54) AUTHENTICATION SYSTEM AND REGISTRATION SYSTEM RELATED TO FACIAL FEATURE INFORMATION

(75) Inventors: Toshio Norita, Mishima-gun (JP); Yuichi Kawakami, Nishinomiya (JP)

(73) Assignee: Konica Minolta Holdings, Inc., Tokyo (JP)

( * ) Notice: Subject to any disclaimer, the term of this patent is extended or adjusted under 35 U.S.C. 154(b) by 961 days.

(21) Appl. No.: 11/588,025

(22) Filed: Oct. 26, 2006

(65) Prior Publication Data

US 2007/0098230 A1  May 3, 2007

(30) Foreign Application Priority Data

Oct. 28, 2005 (JP) ................................ 2005-314426

(51) Int. Cl.
*G06K 9/00* (2006.01)
(52) U.S. Cl. .................... 382/118; 382/115; 382/117
(58) Field of Classification Search .................. 382/115, 382/118, 154, 181, 231; 345/419, 427
See application file for complete search history.

(56) References Cited

U.S. PATENT DOCUMENTS

| | | | | |
|---|---|---|---|---|
| 6,721,444 B1 * | 4/2004 | Gu et al. | ........................ | 382/154 |
| 6,775,397 B1 * | 8/2004 | Hamalainen | .................. | 382/118 |
| 6,961,446 B2 * | 11/2005 | Imagawa et al. | .............. | 382/103 |
| 7,050,608 B2 * | 5/2006 | Dobashi | ........................ | 382/118 |
| 7,120,278 B2 * | 10/2006 | Sukegawa et al. | ............ | 382/118 |
| 7,421,097 B2 * | 9/2008 | Hamza et al. | .................. | 382/118 |
| 2004/0017930 A1 * | 1/2004 | Kim et al. | ..................... | 382/103 |
| 2004/0086157 A1 * | 5/2004 | Sukegawa | ..................... | 382/115 |

FOREIGN PATENT DOCUMENTS

JP  2004-288222 A  10/2004

* cited by examiner

*Primary Examiner* — Brian Q Le
*Assistant Examiner* — Edward Park
(74) *Attorney, Agent, or Firm* — Sidley Austin LLP

(57) ABSTRACT

An authentication system comprises: a generating part for generating face information including at least one of three-dimensional shape information and two-dimensional information in the face of a first person to be authenticated on the basis of measurement information of the first person; a model modifying part for modifying a standard model of a human face by using the face information, thereby generating an individual model of the face of the first person; a calculating part for calculating a first model perfection level as a perfection level of the individual model on the basis of reliability of the face information; an extracting part for extracting first feature information as feature information of the first person from the individual model; an obtaining part for obtaining second feature information as feature information of a second person to be compared which is pre-registered; and an authenticating part for performing an authenticating operation on the first person by using the first model perfection level in addition to similarity between the first feature information and the second feature information.

17 Claims, 23 Drawing Sheets

F I G . 4
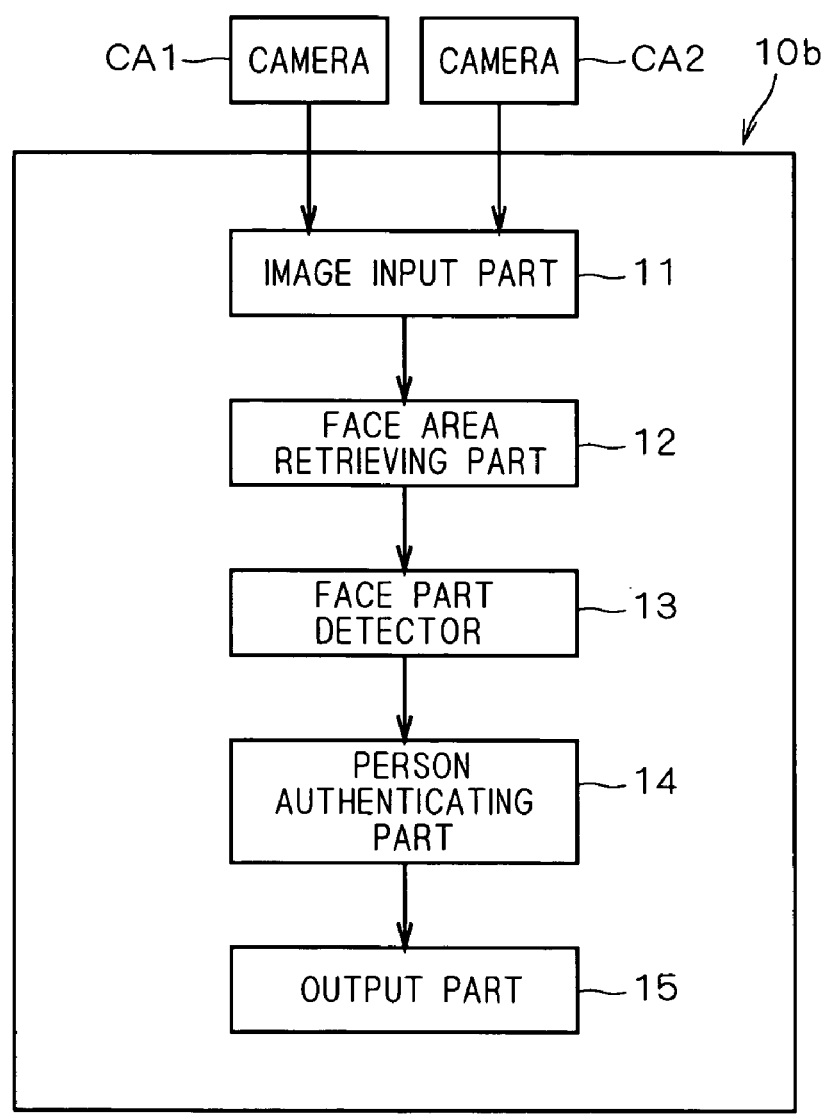

F I G . 2 6
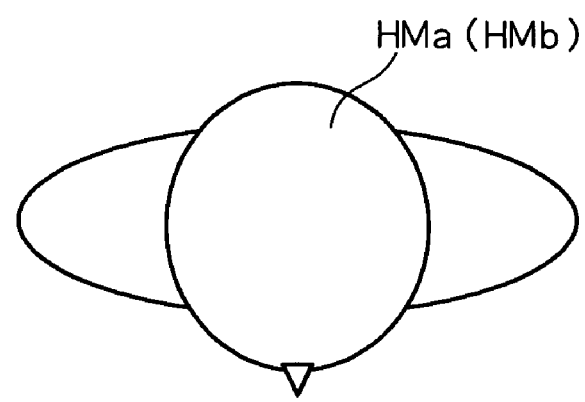

AUTHENTICATION SYSTEM AND REGISTRATION SYSTEM RELATED TO FACIAL FEATURE INFORMATION

This application is based on application No. 2005-314426 filed in Japan, the contents of which are hereby incorporated by reference.

BACKGROUND OF THE INVENTION

1. Field of the Invention

The present invention relates to a face authentication technique.

2. Description of the Background Art

In recent years, various electronized services are being spread with development in the network techniques and the like, and the non-face-to-face personal authentication techniques are in increasing demand. To address the demand, the biometric authentication techniques for automatically identifying a person on the basis of biometric features of the person are being actively studied. The face authentication technique as one of the biometric authentication techniques is a non-face-to-face authentication method and is expected to be applied to various fields of security with a monitor camera, an image database using faces as keys, and the like.

At present, as an authentication method using two face images, a method is proposed, in which the face orientations in two images are set to be the same by using a standard stereoscopic model of a face, and luminance information of a predetermined region in the faces in the same orientation is obtained from the two images, respectively, and is compared, thereby collating the two images (refer to Japanese Patent Laid-Open No. 2004-288222).

The method, however, has a problem such that since the obtained face images are used as they are for authentication without evaluating the reliability, the recognition accuracy is not sufficiently high.

SUMMARY OF THE INVENTION

The present invention is directed to provide a technique capable of evaluating reliability of an obtained face image and performing accurate authenticating operation. To achieve the object, according to a first aspect of the present invention, an authentication system includes: a generating part for generating face information including at least one of three-dimensional shape information and two-dimensional information in the face of a first person to be authenticated on the basis of measurement information of the first person; a model modifying part for modifying a standard model of a human face by using the face information, thereby generating an individual model of the face of the first person; a calculating part for calculating a first model perfection level as a perfection level of the individual model on the basis of reliability of the face information; an extracting part for extracting first feature information as feature information of the first person from the individual model; an obtaining part for obtaining second feature information as feature information of a second person to be compared which is pre-registered; and an authenticating part for performing an authenticating operation on the first person by using the first model perfection level in addition to similarity between the first feature information and the second feature information.

With the authentication system, face information of a person to be authenticated is generated on the basis of measurement information. By using the face information, an individual model of the face of the person to be authenticated is created. A perfection level (first model perfection level) of the individual model is calculated on the basis of the reliability of the face information, and the authenticating operation is performed by using the feature information extracted from the individual model and the first model perfection level. Thus, accurate authentication in which reliability of information used for authentication is also reflected can be achieved.

To achieve the object, according to a second aspect of the present invention, a registration system for registering information for face authentication includes: a generating part for generating face information including at least one of three-dimensional shape information and two-dimensional information in the face of a first person to be registered on the basis of measurement information of the first person; a model modifying part for modifying a standard model of a human face by using the face information, thereby generating an individual model of the face of the first person; a calculating part for calculating a model perfection level as a perfection level of the individual model on the basis of reliability of the face information; an extracting part for extracting feature information of the first person from the individual model; and a registering part for registering the model perfection level and the feature information as the information for face authentication.

With the registration system, face information of a person to be authenticated is generated on the basis of measurement information. By using the face information, an individual model of the face of the person to be authenticated is created. A model perfection level is calculated on the basis of the reliability of the face information, and the feature information extracted from the individual model and the model perfection level are registered as the information for face authentication. Thus, in an authentication system using the information for face authentication, accurate authentication in which reliability of face information is reflected can be achieved.

Further, the invention is also directed to a computer software program.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram showing various functions of the controller in the face verification system.

FIG. 26 is a diagram showing a three-dimensional shape measuring device constructed by a laser beam emitter and a camera.

DESCRIPTION OF THE PREFERRED EMBODIMENTS

Embodiments of the present invention will be described hereinbelow with reference to the drawings.

1. First Embodiment

Outline of Operation

Figure 1:
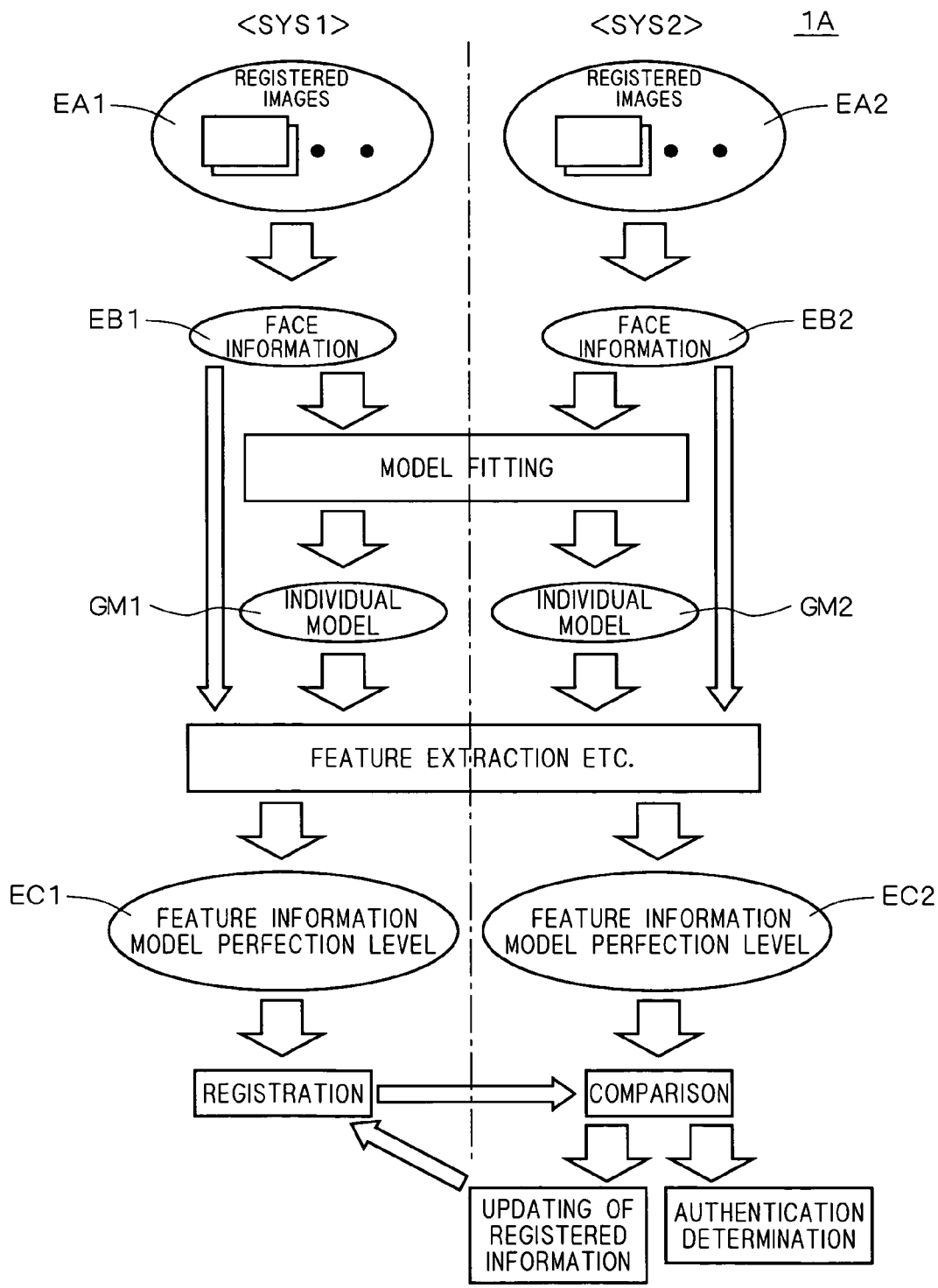
FIG. 1 is a diagram showing general operation of a face authentication system according to a first embodiment of the invention.

FIG. 1 is a diagram showing general operation of a face authentication system 1A according to a first embodiment of the present invention.

As shown in FIG. 1, the face authentication system 1A has a face registration system SYS1 and a face verification system SYS2 as two subsystems.

In the face registration system SYS1, face information EB1 of a person HMa to be registered is generated on the basis of stereo images EA1 of the person HMa to be registered which are captured repeatedly (continuously) at different timings (time points), and an individual model GM1 is generated by modifying a standard model on the basis of the face information EB1. Predetermined processes (such as feature extracting process and model perfection level computing process) corresponding to the individual model GM1 and the face information EB1 are executed, thereby obtaining feature information and model perfection level of the individual model GM1, respectively. The feature information of the person HMa to be registered and the model perfection level is registered as registrant information EC1 of the person HMa to be registered into a person information storage 34 which will be described later.

In the face verification system SYS2, first, processes similar to those performed in the face registration system SYS1 are executed on the basis of stereo images EA2 (measurement information) of a person HMb to be authenticated which are captured repeatedly (continuously) at different timings (time points). Concretely, face information EB2 of the person HMb to be authenticated is generated on the basis of the stereo images EA2 (measurement information) of the person HMb to be authenticated which are captured repeatedly at different timings, and an individual model GM2 is generated by modifying a standard model on the basis of the face information EB2. Predetermined processes (such as feature extracting process and model perfection level computing process) corresponding to the individual model GM2 and the face information EB2 are executed, thereby obtaining feature information of the person HMb to be authenticated and model perfection level of the individual model GM2, as information EC2 of the person to be authenticated, respectively.

Figure 5:
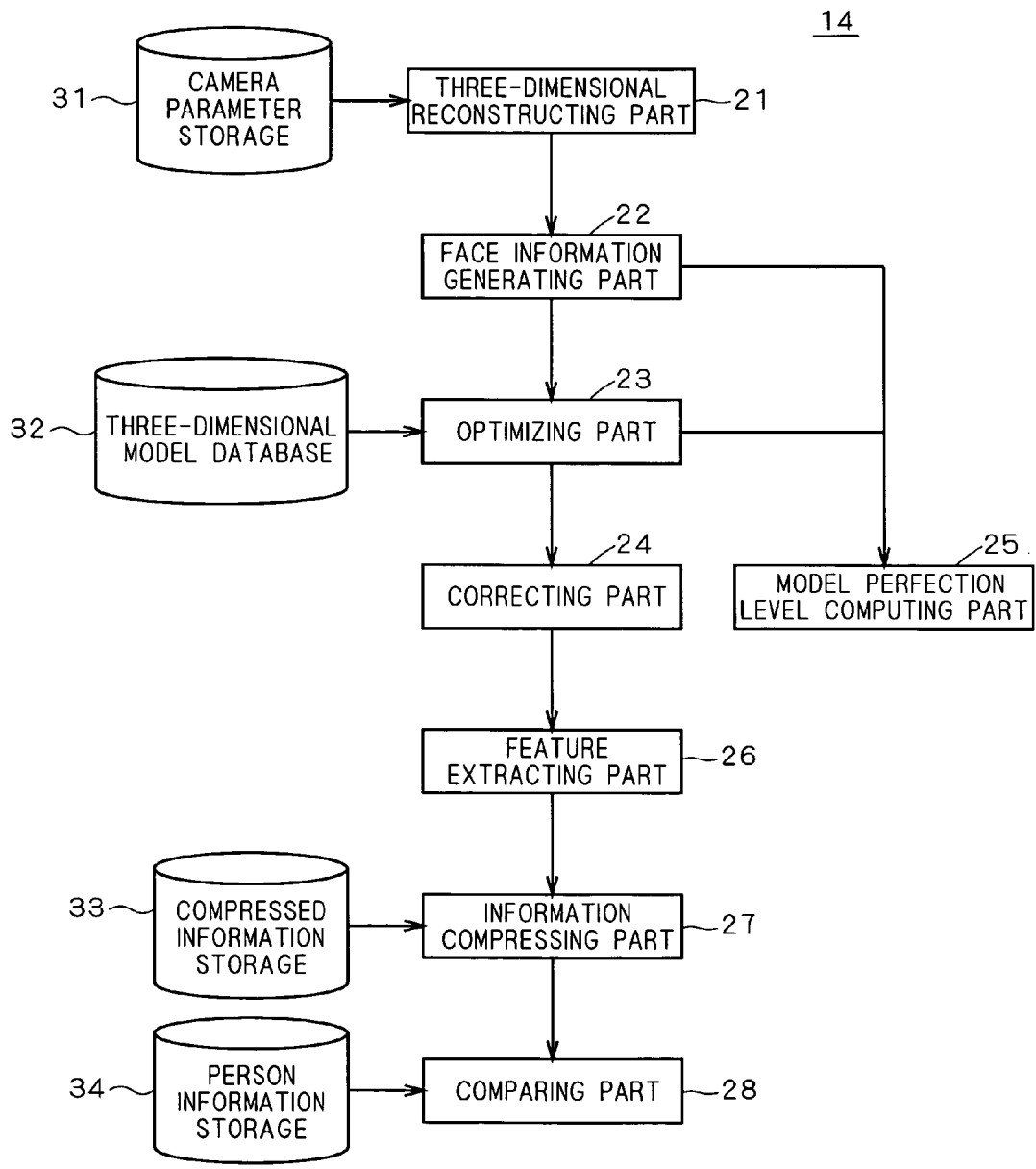
FIG. 5 is a block diagram showing a detailed functional configuration of a personal authenticating part.

In the face verification system SYS2, authenticating operation is performed, for comparing the information EC2 of the person HMb to be authenticated with the registrant information EC1 (feature information and the like) of the person HMa to be registered which is registered in the person information storage 34 (FIG. 5).

As will be described later, in the authenticating operation, the model perfection level of the individual model GM2 is used. The model perfection level is calculated on the basis of reliability of the face information EB2 of the person HMb to be authenticated. Consequently, authentication in which the reliability of the face information EB2 is reflected can be realized.

By performing the authentication at authentication level (authentication accuracy) requested for the authentication system, proper operation can be performed in various situations (scenes).

More specifically, such a face authentication system 1A can be applied to, for example, a copying machine.

A situation is assumed such that a person (user) to use a copying machine is specified and an operation panel dedicated to the user is displayed.

Concretely, when the user approaches the copying machine, operation of capturing face images (verification images) of the user starts and is continued at predetermined timings until the user reaches an operation panel of the copying machine. In predetermined time until the user reaches the operation panel, the person is specified (authenticated), and the operation panel of the copying machine changes to a panel dedicated to the user. Consequently, the operation content often used by the user is selectively displayed in the screen of the operation panel, and the working efficiency can be improved.

The specification of a person is performed to improve operability. Even if the specification of a person is performed erroneously, it is sufficient to make an error correction by entering a password of the operator or the like and log in the system again. That is, the authentication accuracy required for the face authentication system 1A for selecting a panel state is relatively low.

Another situation is assumed such that when printing of confidential document is permitted to only a specific person, printing of the confidential document is performed. In the situation, the authentication accuracy required for the face authentication system 1A is relatively high from the viewpoint of security protection.

The face authentication system 1A repeatedly obtains face images of the user from the beginning of approach of the user until reliable information necessary for the required authentication accuracy is generated. Face images obtained for a relatively long period may include various face images in which the face orientation of the user changes, so that face authentication using various information can be performed, and high-accuracy authentication can be realized. Specifically, the face authentication system 1A evaluates the reliability (quality and/or quantity) of the obtained data as model perfection level, and uses the evaluation value for face image capturing and/or authenticating operation. With the configuration, in the case where the authentication accuracy is requested more than higher response speed of authentication from the viewpoint of confidential document protection, proper authentication can be performed.

As described above, the face authentication system 1A can perform proper authentication according to the required authentication accuracy (authentication level).

In the following, the face verification system SYS2 and the face registration system SYS1 of the face authentication system 1A will be described in detail. Outline of Configuration of Face Verification System SYS2

Figure 2:
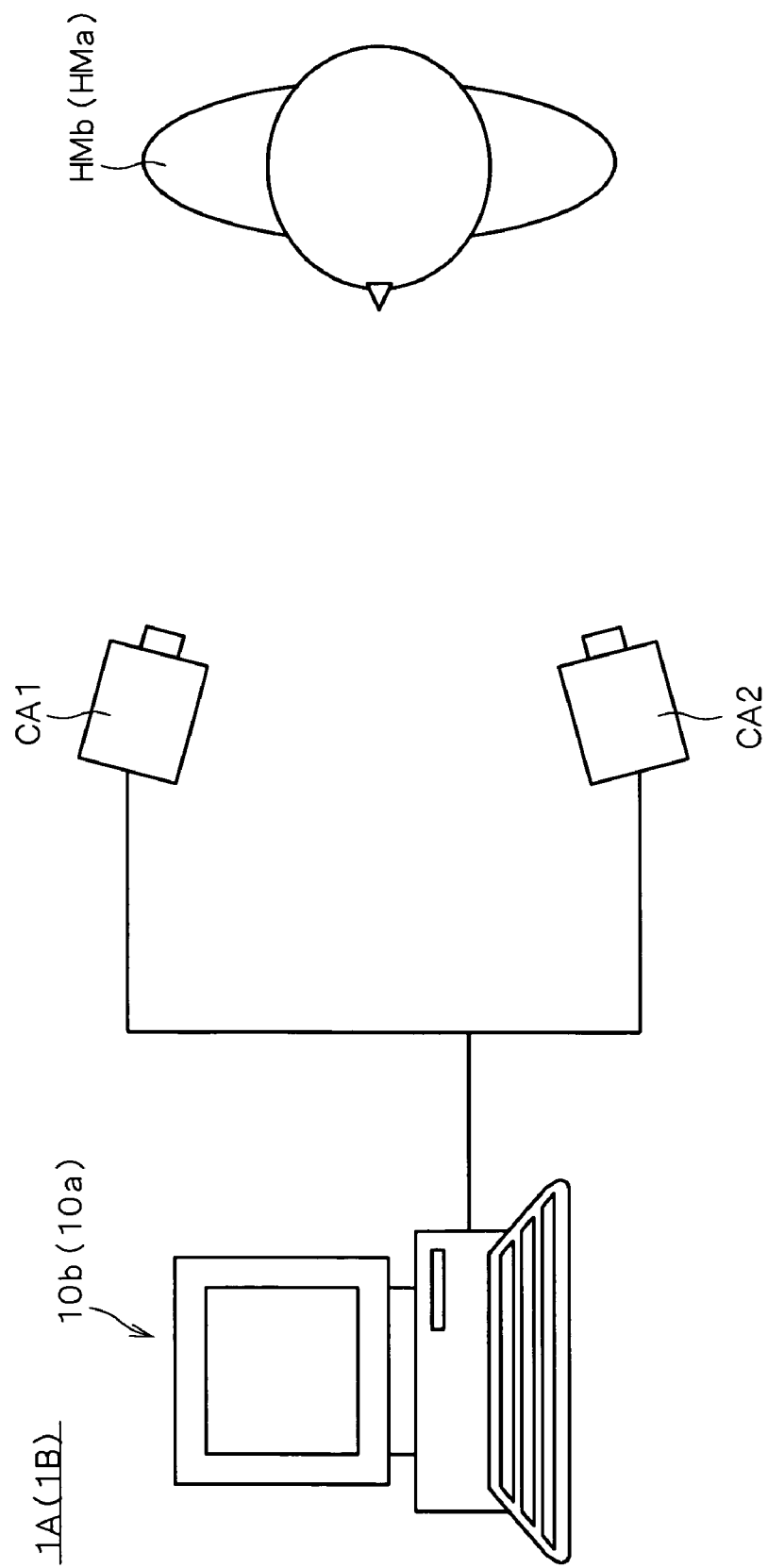
FIG. 2 is a configuration diagram showing a face verification system according to the first embodiment of the invention.

FIG. 2 is a configuration diagram showing the face verification system SYS2 according to a first embodiment of the invention. As shown in FIG. 2, the face verification system SYS2 is constructed by a controller 10b and two image capturing cameras (hereinbelow, also simply called "cameras") CA1 and CA2.

The cameras CA1 and CA2 are disposed so as to be able to capture images of the face of the person HMb to be authenticated from different positions. When face images of the person HMb to be authenticated are captured by the cameras CA1 and CA2, appearance information, specifically, two face images of the person HMb to be authenticated captured by the image capturing operation is transmitted to the controller 10b via a communication line. The communication system for image data between the cameras and the controller 10b is not limited to a wired system but may be a wireless system.

Figure 3:
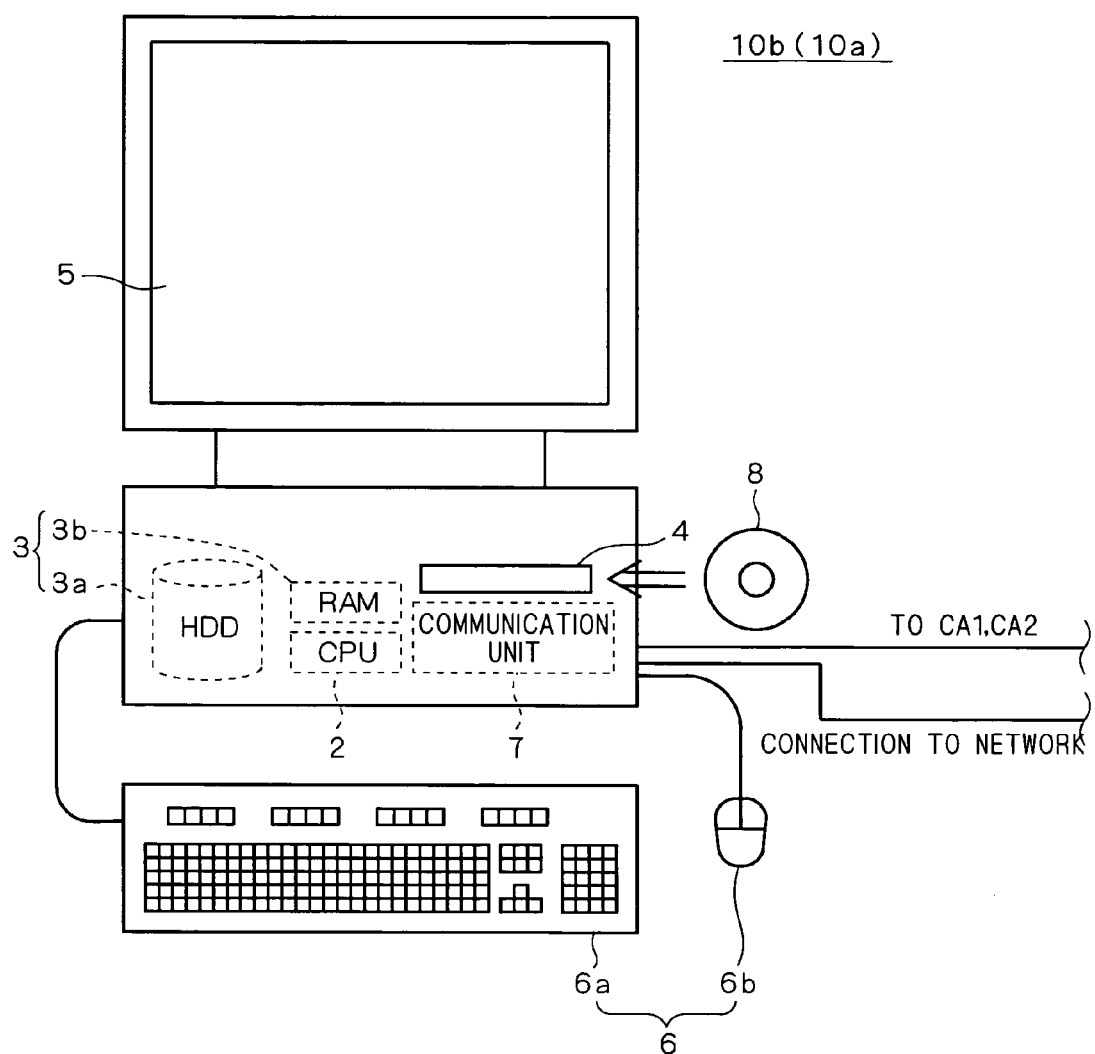
FIG. 3 is a diagram showing a configuration outline of a controller in the face verification system.

FIG. 3 is a diagram showing a schematic configuration of the controller 10b. As shown in FIG. 3, the controller 10b is a general computer such as a personal computer including a CPU 2, a storage 3, a media drive 4, a display 5 such as a liquid crystal display, an input part 6 such as a keyboard 6a and a mouse 6b as a pointing device, and a communication part 7 such as a network card. The storage 3 has a plurality of storage media, concretely, a hard disk drive (HDD) 3a and a RAM (semiconductor memory) 3b capable of performing processes at a higher speed than the HDD 3a. The media drive 4 can read information recorded on a portable recording medium 8 such as CD-ROM, DVD (Digital Versatile Disk), flexible disk, or memory card. The information supplied to the controller 10b is not limited to information supplied via the recording medium 8 but may be information supplied via a network such as LAN or the Internet.

Next, the various functions of the controller 10b will be described.

FIG. 4 is a block diagram showing the various functions of the controller 10b. FIG. 5 is a block diagram showing a detailed functional configuration of a personal authenticating part 14.

The various functions of the controller 10b are conceptual functions realized by executing a predetermined software program (hereinbelow, also simply called "program") with various kinds of hardware such as the CPU in the controller 10b.

As shown in FIG. 4, the controller 10b has an image input part 11, a face area retrieving part 12, a face part detector 13, the personal authenticating part 14, and an output part 15.

The image input part 11 has the function of inputting two images (stereo images) captured by the cameras CA1 and CA2 to the controller 10b.

The face area retrieving part 12 has the function of specifying a face part in an input face image.

The face part detector 13 has the function of detecting the positions of feature parts (for example, eyes, eyebrows, nose, mouth, and the like) in the specified face area.

The personal authenticating part 14 is constructed to mainly authenticate a face and has the function of authenticating a person by using a face image. The details of the personal authenticating part 14 will be described later.

The output part 15 has the function of outputting an authentication result obtained by the personal authenticating part 14.

Next, the detailed configuration of the personal authenticating part 14 will be described with reference to FIG. 5.

As shown in FIG. 5, the personal authenticating part 14 has a three-dimensional reconstructing part 21, a face information generating part 22, an optimizing part 23, a correcting part 24, a model perfection level computing part 25, a feature extracting part 26, an information compressing part 27, and a comparing part 28.

The three-dimensional reconstructing part 21 has the function of calculating coordinates in three dimensions of each feature point on the basis of two-dimensional coordinates of the feature point which is set for a feature part of a face obtained from input images. The three-dimensional coordinate calculating function is realized by using camera information stored in a camera parameter storage 31.

The face information generating part 22 has the function of sequentially obtaining three-dimensional coordinates of each of feature points of a face obtained from stereo images (two images) repeatedly (continuously) input to the three-dimensional reconstructing part 21, and generating the face information EB2 (hereinbelow, also called "correction face information") of the person HMb to be authenticated. Concretely, the face information generating part 22 has the function of executing predetermined statistic process using reliability of the three-dimensional coordinates of each feature point to the sequentially obtained three-dimensional coordinates of each feature point, and correcting the three-dimensional coordinates of each feature point. The three-dimensional coordinates of each feature point corrected are also called "corrected three-dimensional coordinates" or "corrected three-dimensional position".

The optimizing part 23 has the function of generating the individual model GM2 by modifying a standard stereoscopic model (also simply called "standard model") of a human face stored in a three-dimensional model database 32 based on the face information generated by the face information generating part 22.

The correcting part 24 has the function of correcting the generated individual model GM2.

By the processing parts 21 to 24, information of the person HMb to be authenticated is normalized and converted into forms which can be easily compared with each other. The individual model generated by the functions of the processing parts includes both three-dimensional information and two-dimensional information of the person HMb to be authenticated. The "three-dimensional information" is information related to a stereoscopic configuration constructed by three-dimensional coordinate values or the like. The "two-dimensional information" is information related to a plane configuration constructed by surface information (texture information) and/or information of positions in a plane or the like.

The model perfection level computing part 25 has the function of computing the perfection level of the generated individual model on the basis of the reliability of each of the feature points.

The feature extracting part 26 has a feature extracting function of extracting the three-dimensional information and two-dimensional information from the individual model generated by the processing parts 21 to 24.

The information compressing part 27 has the function of compressing the three-dimensional information and the two-dimensional information used for face authentication by converting each of the three-dimensional information and the two-dimensional information extracted by the feature extracting part 26 to a proper face feature amount (feature information) for face authentication. The information compressing function is realized by using information stored in a compressed information storage 33, and the like.

The comparing part 28 has the function of calculating similarity between a face feature amount of the registered person (person to be compared) which is pre-registered in a person information storage 34 and a face feature amount of the person HMb to be authenticated, which is obtained by the above-described function parts, thereby authenticating the face. In the comparing part 28 in the embodiment, in addition to the similarity between the face feature amount of the person to be compared and the face feature amount of the person HMb to be authenticated, perfection level of an individual model calculated by the model perfection level computing part 25 is also used for authentication.

Outline of Configuration of Face Registration System SYS1

Next, the outline of the configuration of the face registration system SYS1 will be described. In the following description, the points different from the outline of the configuration of the face registration system SYS1 will be mainly described. The same reference numerals are designated to common parts and their description will not be repeated.

The face registration system SYS1 has a configuration similar to that of the face verification system SYS2 shown in FIG. 2. Specifically, the face registration system SYS1 has the controller 10a and the two cameras CA1 and CA2. Appearance information, that is, two face images of the person HMa to be registered, obtained by the two cameras can be input to the controller 10a.

Various functions of the controller 10a will now be described.

Figure 6:
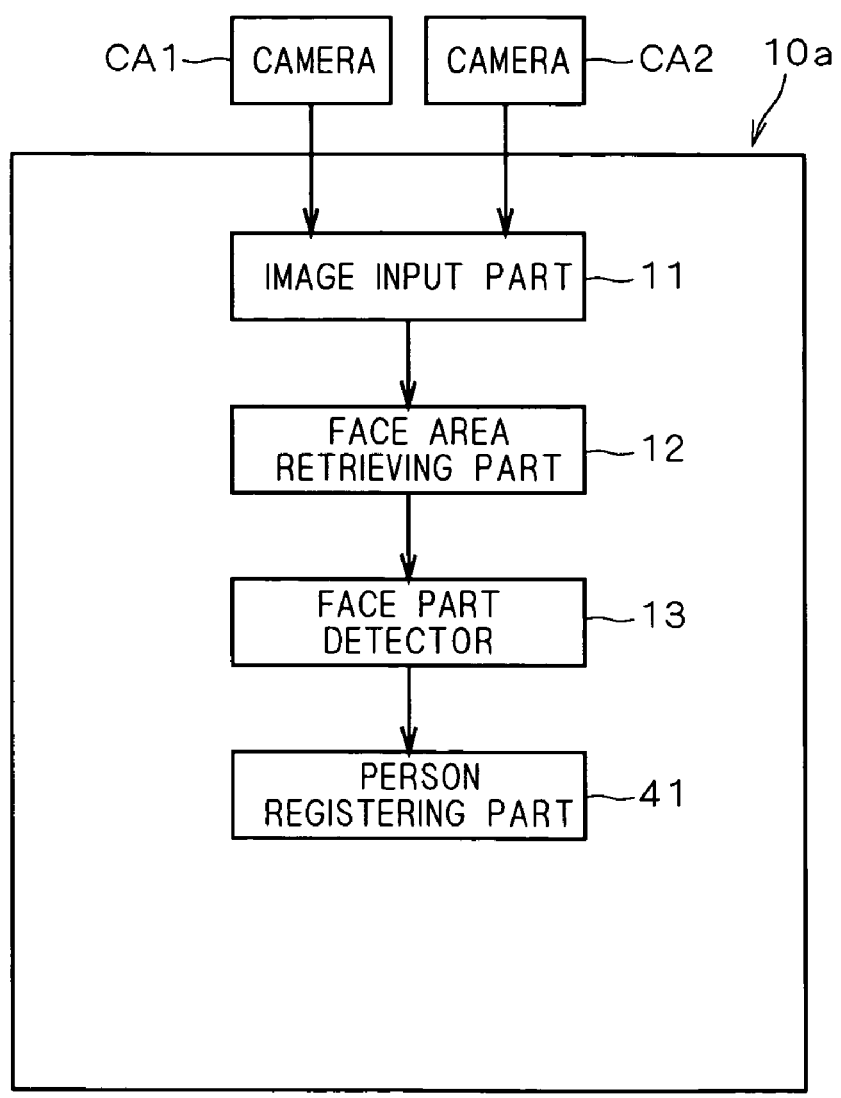
FIG. 6 is a diagram showing various functions of a controller in a face registration system.
Figure 7:
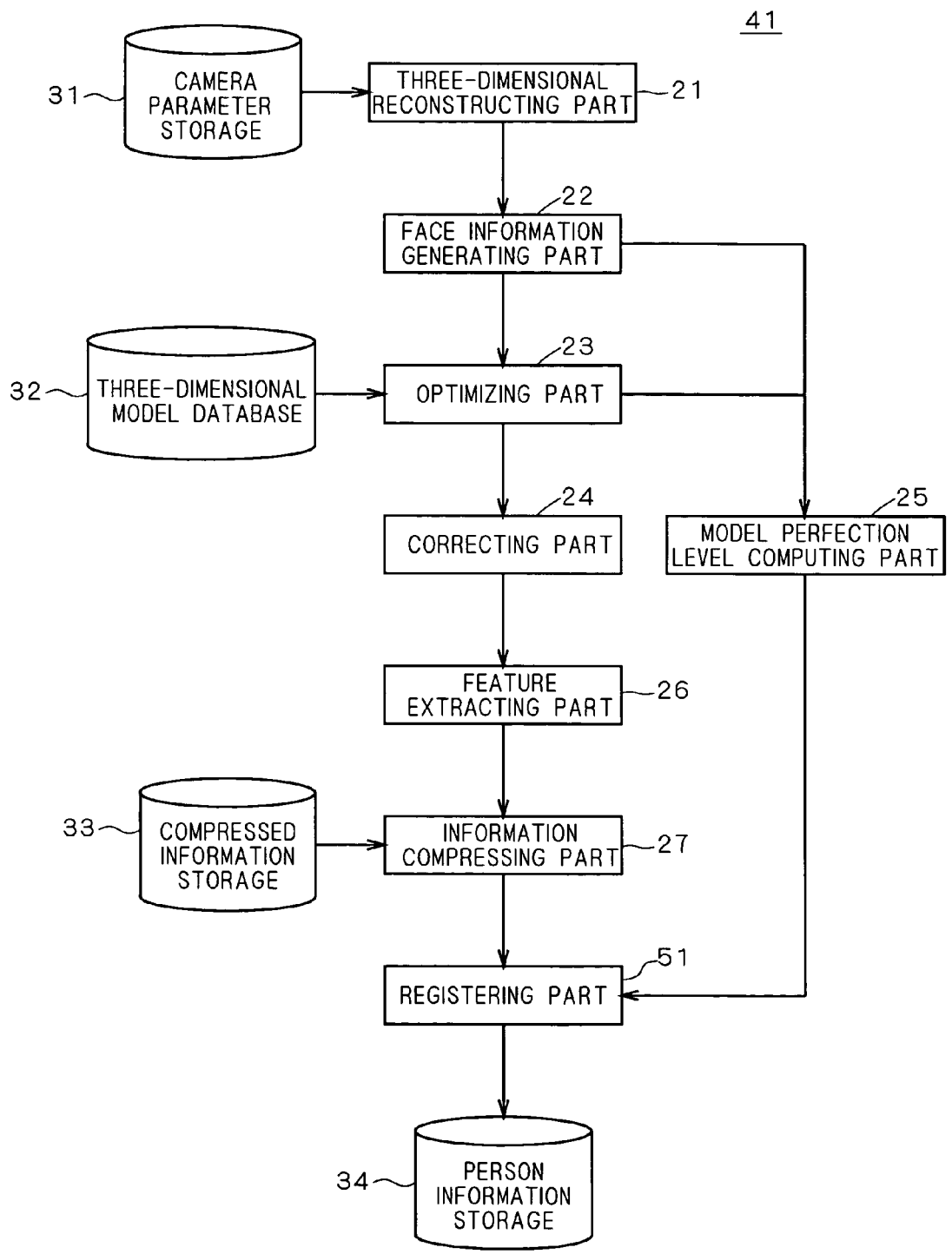
FIG. 7 is a block diagram showing a detailed functional configuration of a person registering part.

FIG. 6 is a diagram showing various functions of the controller 10a, and FIG. 7 is a block diagram showing a detailed function configuration of a personal registering part 41.

The controller 10a has a hardware configuration similar to that of the controller 10a shown in FIG. 3. The various functions of the controller 10a are conceptual functions realized by executing a predetermined software program (hereinbelow, also simply called "program") with various kinds of hardware such as the CPU in the controller 10a.

As shown in FIG. 6, the controller 10a has, in addition to the functions (image input part 11, face area retrieving part 12, and face part detector 13) of the controller 10b, the personal registering part 41. To the controller 10a having the functions, two images of the person HMa to be registered obtained by the two cameras (CA1 and CA2) are input. Processes using the function parts are performed on the input information (measurement information).

The personal registering part 41 is constructed to mainly register feature information of a face and has the function of generating the registrant information EC1 from the face images of persons. The details of the personal registering part 41 will now be described.

The detailed configuration of the personal registering part 41 will be described with reference to FIG. 7.

As shown in FIG. 7, the personal registering part 41 has a registering part 51 in addition to the three-dimensional reconstructing part 21, face information generating part 22, optimizing part 23, correcting part 24, model perfection level computing part 25, feature extracting part 26, and information compressing part 27.

The three-dimensional reconstructing part 21, face information generating part 22, optimizing part 23, correcting part 24, model perfection level computing part 25, feature extracting part 26, and information compressing part 27 have functions similar to the corresponding functions in the controller 10b.

The registering part 51 has the function of registering, as the registrant information EC1 of the person HMa to be registered, the three-dimensional and two-dimensional face feature amounts (feature information) compressed and generated by the information compressing part 27 and the perfection level of an individual model into the person information storage 34.

In the embodiment, information registered in the person information storage 34 in the controller 10a is also transferred and stored to the person information storage 34 in the controller 10b by proper synchronous process (overwriting process or the like). Operation of Face Verification System SYS2

Next, the authenticating operation realized by the face verification system SYS2 will be described. Concretely, the case of actually authenticating a predetermined person photographed by the cameras CA1 and CA2 as the person HMb to be authenticated will be described. Three-dimensional shape information measured on the basis of the principle of triangulation using images captured by the cameras CA1 and CA2 is used as the three-dimensional information, and texture (brightness) information is used as the two-dimensional information.

Figure 8:
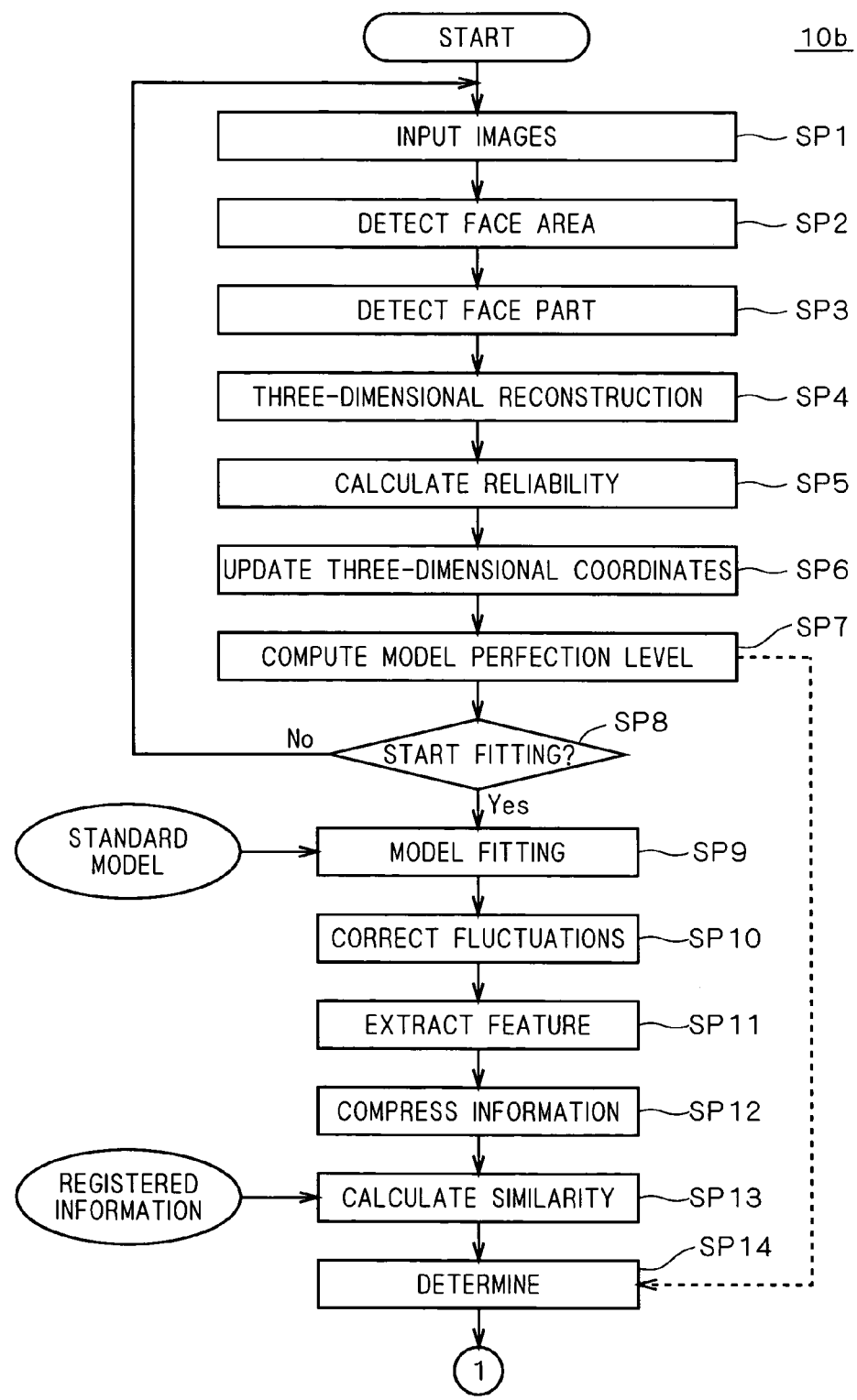
FIG. 8 is a flowchart showing operation of a controller in the face verification system.
Figure 9:
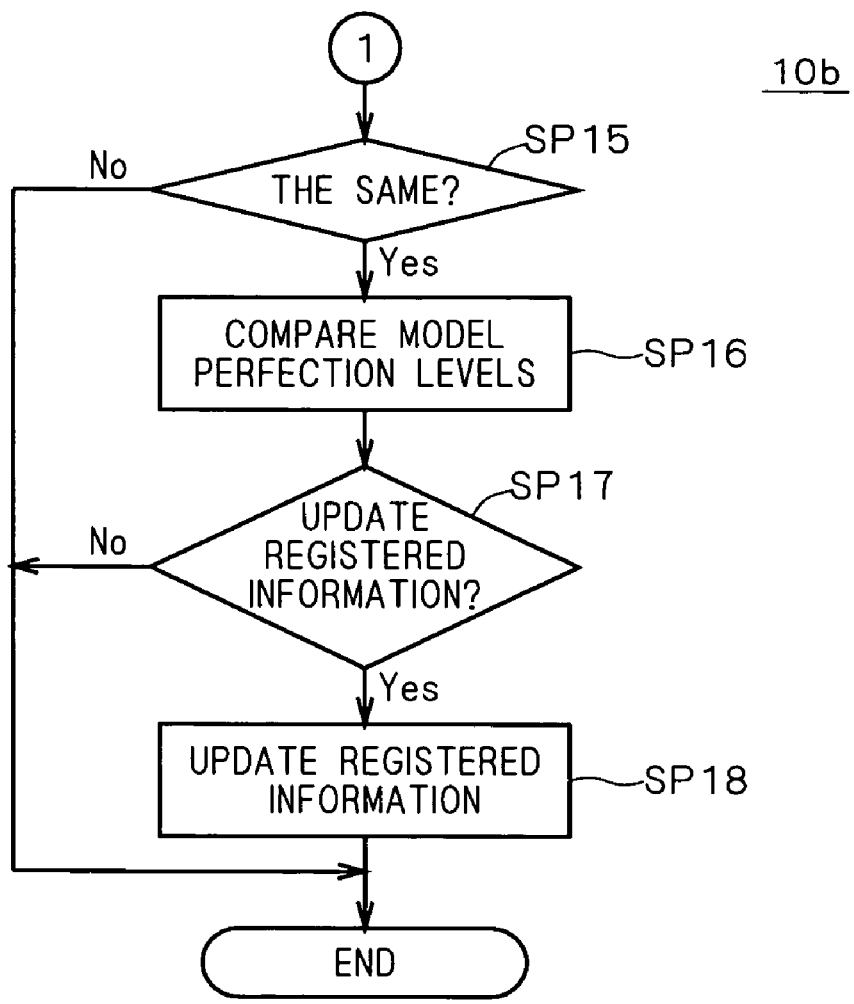
FIG. 9 is a flowchart showing operation of the controller in the face verification system.
Figure 10:
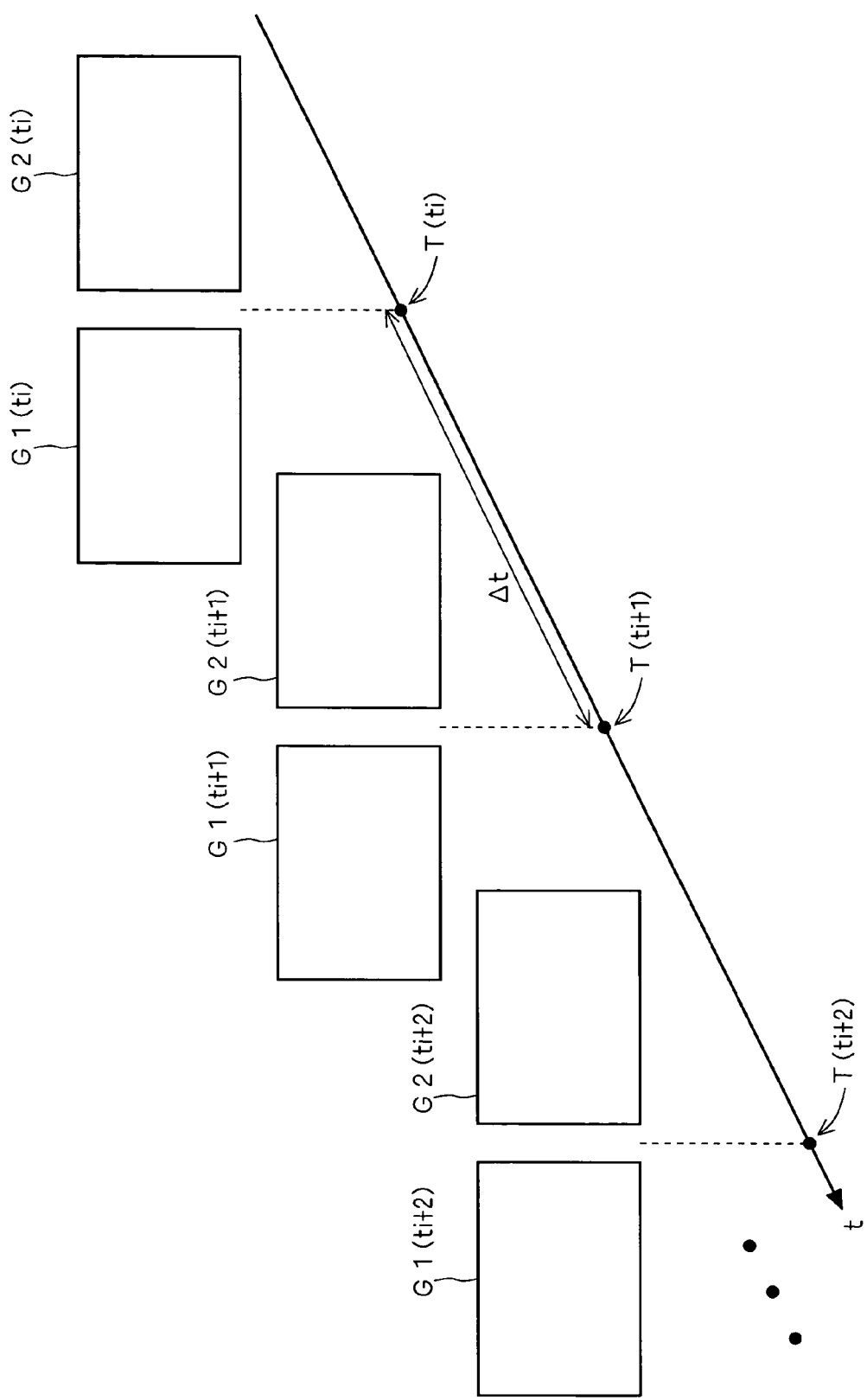
FIG. 10 is a diagram in which images continuously obtained from two cameras are displayed in time series.
Figure 11:
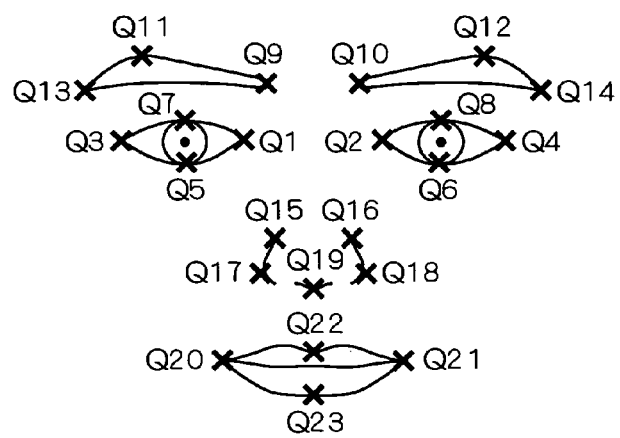
FIG. 11 is a diagram showing feature points of a feature part in a face image.
Figure 12:
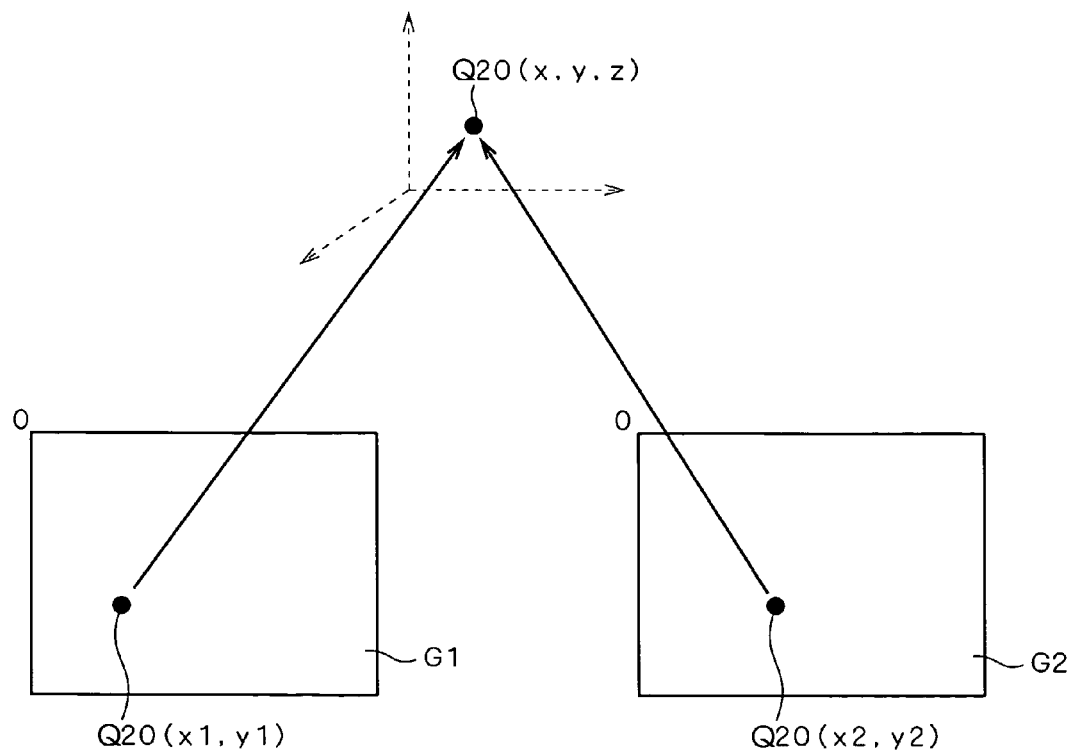
FIG. 12 is a schematic diagram showing a state of calculating three-dimensional coordinates by using the principle of triangulation from feature points in a two-dimensional image.
Figure 13:
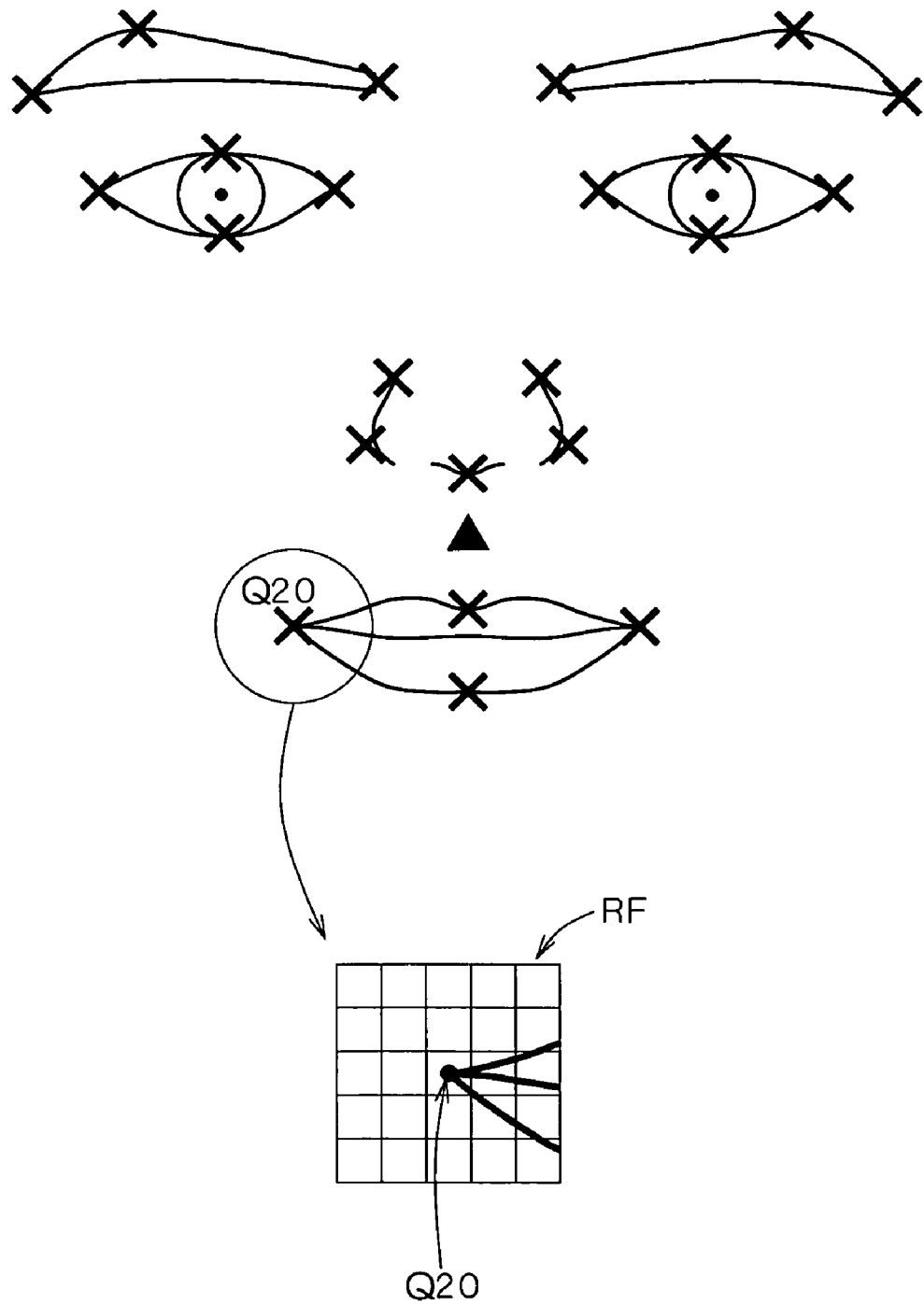
FIG. 13 is a diagram showing a predetermined region around a feature point Q20 as a center.

FIGS. 8 and 9 are a flowchart of the general operation of the controller 10b. FIG. 10 is a diagram in which images continuously captured by the two cameras are displayed in time series. FIG. 11 is a diagram showing feature points of a feature part in a face image. FIG. 12 is a schematic diagram showing a state where three-dimensional coordinates are calculated by using the principle of triangulation from feature points in two-dimensional images. Reference numeral G1 in FIG. 12 indicates an image G1 captured by the camera CA1 and input to the controller 10b. Reference numeral G2 indicates an image G2 captured by the camera CA2 and input to the controller 10b. Points Q20 in the images G1 and G2 correspond to a point at the right end of a mouth in FIG. 11. FIG. 13 is a diagram showing a predetermined region RF around the feature point Q20 as a center.

As shown in FIG. 8, in the controller 10b, in the processes from step SP1 to step SP8, the face information EB2 of the person HMb to be authenticated and model perfection level of the individual model is generated (updated) on the basis of stereo images of the person HMb to be authenticated sequentially (repeatedly) captured at different time points. Further, in the processes in steps SP9 to SP12, an individual model is generated on the basis of the face information EB2, and the face feature amount of the person HMb to be authenticated and model perfection level of the individual model are generated as the information EC2 of the person to be authenticated. In the following steps SP13 and SP14, the face authentication of the person HMb to be authenticated is performed using the information EC2 of the person to be authenticated. The processes in the controller 10b will be described in detail hereinbelow.

First, processes executed in steps SP1 to SP8 (also called "face information generating process") will be described. As described above, in the face information generating process (steps SP1 to SP8), the face information EB2 of the person HMb to be authenticated used for model fitting which will be described later is generated on the basis of the face images of the person HMb to be authenticated repeatedly captured at different timings.

The face information generating process (steps SP1 to SP8) is a loop process sequentially and repeatedly executed every stereo images (two images) input in time series at different timings until "end" is determined in a predetermined determining process (step SP8) which will be described later.

When it is assumed that image capturing operation on the person HMb to be authenticated starts at time T (ti) as shown in FIG. 10 by the two cameras CA1 and CA2, the face information generating process on two face images G1(ti) and G2(ti) input to the controller 10b is executed, thereby generating face information (face information at the time T(ti)) of the two face images G1(ti) and G2(ti).

Next, at time T(ti+1) after lapse of short time Δt, two face images G1(ti+1) and G2(ti+1) are newly captured and input to the controller 10b. By the face information generating process, face information (corrected face information) is generated using the face information at the time T(ti) and the face information based on the images captured at the time T(ti+1).

Concretely, first, face information (face information based on the images captured at time T(ti+1)) is generated on the basis of the two face images G1(ti+1) and G2(ti+1) captured at the time T(ti+1). By executing predetermined statistic process on the face information based on the images captured at the time T(ti+1) and the face information at the time T(ti), face information at the time T(ti+1) is generated. In other words, the face information at the time T(ti+1) is generated by reflecting the face information at the time T(ti) in the face information based on the images captured at the time T(ti+1).

Further, when two images G1(ti+2) and G2(ti+2) newly captured at time T(ti+2) are input, in the face information generating process, face information (corrected face information) in which the face information at the time T(ti+1) is reflected is generated.

Specifically, face information (face information based on the images captured at the time T(ti+2)) is generated on the basis of the two face images G1(ti+2) and G2(ti+2) captured at the time T(ti+2). By executing the predetermined statistic process on the face information based on the images captured at the time T(ti+2) and the face information at the time T(ti+1), face information at the time T(ti+2) is generated. In other words, the face information at the time T(ti+2) is generated by reflecting the face information at the time T(ti+1) in the face information based on the images captured at the time T(ti+2).

As described above, in the face information generating process (steps SP1 to SP8), each time new face images are captured, by sequentially updating face information using face information generated in the past and face information generated from the new images, very reliable face information (corrected face information) can be generated.

In the following, the processes executed in the face information generating process (steps SP1 to SP8) will be described in detail.

In step SP1, face images (G1 and G2) of a predetermined person (person to be registered) captured by the cameras CA1 and CA2 are input to the controller 10b via a communication line. Each of the cameras CA1 and CA2 for capturing face images is a general image capturing apparatus capable of capturing a two-dimensional image. A camera parameter Bi ($i=1, \ldots, N$) indicative of the positional posture of each camera CAi or the like is known and pre-stored in the camera parameter storage 31 (FIG. 5). N indicates the number of cameras. Although the case where N=2 is described in the embodiment, N may be three or more (N≧3, three or more cameras may be used). The camera parameter Bi will be described later.

In step SP2, an area in which the face exists is detected from each of the two images (G1 and G2) input from the cameras CA1 and CA2. As a face area detecting method, for example, a method of detecting a face area from each of the two images by template matching using a prepared standard face image can be employed.

In step SP3, the position of a feature part in the face is detected from the face area image detected in step SP2. Examples of the feature parts in the face are eyes, eyebrows, nose, mouth, and the like. In step SP3, the coordinates of feature points Q1 to Q23 of the parts as shown in FIG. 11 are calculated. A feature part can be detected by template matching using a standard template of the feature part. The coordinates of a feature point calculated are expressed as coordinates on the images G1 and G2 input from the cameras. For example, with respect to the feature point Q20 corresponding to the right end of the mouth in FIG. 11, as shown in FIG. 12, coordinate values in the two images G1 and G2 are calculated, respectively. Concretely, by using the upper left end point of the image G1 as the origin O, coordinates (x1, y1) on the image G1 of the feature point Q20 are calculated. In the image G2 as well, similarly, coordinates (x2, y2) on the image G2 of the feature point Q20 are calculated.

A brightness value of each of pixels in an area using, as an apex point, a feature point in an input image is obtained as information of the area (hereinbelow, also called "texture information"). The texture information in each area is pasted (mapped) to a modified individual model in step SP9 or the like which will be described later. In the case of the embodiment, the number of input images is two, so that an average brightness value in corresponding pixels in corresponding areas in the images is used as the texture information of the area.

In the following step SP4 (three-dimensional reconstructing process), three-dimensional coordinates $Ms^{(j)}$ ($j=1, \ldots, m$) of each feature point Qj are calculated as face information on the basis of two-dimensional coordinates $Ui^{(j)}$ in each of images Gi ($i=1, \ldots, N$) at the feature points Qj detected in step SP3 and the camera parameters Bi of the camera which has captured the images Gi. "m" denotes the number of feature points.

Calculation of the three-dimensional coordinates $Ms^{(j)}$ will be described concretely hereinbelow.

The relations among the three-dimensional coordinates $Ms^{(j)}$ at each feature point Qj, the two-dimensional coordinates $Ui^{(j)}$ at each feature point Qj, and the camera parameter Bi are expressed as Equation (1):

$$\mu i Ui^{(j)} = Bi Ms^{(j)} \qquad (1)$$

where $\mu i$ is a parameter indicative of a fluctuation amount of a scale. A camera parameter matrix Bi indicates values peculiar to each camera, which are obtained by capturing an image of an object whose three-dimensional coordinates are known, and is expressed by a projection matrix of 3×4.

As a concrete example of calculating three-dimensional coordinates by using Equation (1), the case of calculating three-dimensional coordinates $Ms^{(20)}$ at a feature point Q20 will be considered with reference to FIG. 12. Equation (2)

shows the relation between coordinates (x1, y1) at the feature point Q20 on the image G1 and three-dimensional coordinates (x, y, z) when the feature point Q20 is expressed in a three-dimensional space. Similarly, Equation (3) shows the relation between the coordinates (x2, y2) at the feature point Q20 on the image G2 and the three-dimensional coordinates (x, y, z) when the feature point Q20 is expressed in a three-dimensional space.

$$\mu 1 \begin{pmatrix} x1 \\ y1 \\ 1 \end{pmatrix} = B1 \begin{pmatrix} x \\ y \\ z \\ 1 \end{pmatrix} \quad (2)$$

$$\mu 2 \begin{pmatrix} x2 \\ y2 \\ 1 \end{pmatrix} = B2 \begin{pmatrix} x \\ y \\ z \\ 1 \end{pmatrix} \quad (3)$$

Unknown parameters in Equations (2) and (3) are five parameters in total; two parameters $\mu 1$ and $\mu 2$ and three component values x, y, and z of three-dimensional coordinates $Ms^{(20)}$. On the other hand, the number of equalities included in Equations (2) and (3) is six, so that each of the unknown parameters, that is, three-dimensional coordinates (x, y, z) at the feature point Q20 can be calculated. Similarly, three-dimensional coordinates $Ms^{(j)}$ at all of feature points Qj can be obtained.

In step SP5, the reliability of three-dimensional coordinates (face information) at each feature point is calculated. In the embodiment, a correlation value between corresponding areas (regions) in two images, each of the corresponding areas having corresponding feature points as a center is used as an evaluation value $H^{(j)}$ of reliability. For example, in the case of calculating the reliability of the feature point Q20, as shown in FIG. 13, the correlation value $F^{(20)}$ between predetermined areas RF (region having 5×5 pixels) each using the feature point Q20 as a center in two images is calculated.

Concretely, as shown by Equation (4), the differential absolute value of pixel signals (luminance information) of corresponding two pixels in each of 25 pairs is computed, and the inverse of the average value of 25 differential absolute values can be used as a correlation value $F^{(j)}$.

$$H^{(j)} = F^{(j)} = u \bigg/ \sum_{r}^{u} (G1r^{(j)} - G2r^{(j)}) \quad (4)$$

where u denotes the number of pixels, and G1 and G2 express luminance values of corresponding pixels in each image. The small letter "r" indicates the r-th pixel.

Such a correlation value $F^{(j)}$ becomes a large value in the case where corresponding predetermined areas RF include the same part of the subject, and becomes a small value in the case where the predetermined areas RF are different parts. That is, when the correlation value $F^{(j)}$ is large, the reliability of coordinate information of the feature point is high. When the correlation value $F^{(j)}$ is small, the reliability of coordinate information of the feature point is low.

In steps SP1 to SP5, the face information (the three-dimensional coordinates $Ms^{(j)}$ at each of the feature points Qj in the face) of the person HMb to be authenticated and the reliability of the face information is generated on the basis of two images input.

The face information generating process (steps SP1 to SP8) is a loop process executed on every stereo images (two images) repeatedly input at different timings. The process (steps SP1 to SP5) is executed for each input stereo image, and the face information and the reliability of the face information is generated for each input stereo image.

The processes in steps SP6 to SP8 are repeatedly executed on the basis of the face information and the reliability of the face information generated for each input stereo image.

In step SP6, predetermined statistic process is executed on the three-dimensional coordinates $Ms^{(j)}$ of each feature point Qj of each stereo image calculated in step SP4 and the reliability at each feature point of each stereo image calculated in step SP5, thereby generating corrected face information (corrected three-dimensional coordinates $Mm^{(j)}$ at each of the feature points in the face) of the person HMb to be authenticated.

Concretely, as shown by equation (5), the corrected three-dimensional coordinates $Mm^{(j)}$ at each feature point are obtained by calculating weighted mean of the three-dimensional coordinates $Ms^{(j)}$ at the feature points of the stereo images by using the reliability at the feature points of the stereo images.

$$Mm^{(j)} = \frac{\sum_{ti=0}(Ms^{(j)}(ti) \cdot H^{(j)}(ti))}{\sum_{ti=0} H^{(j)}(ti)} \quad (5)$$

In step SP6, texture information is obtained sequentially so as to compensate a region which has not obtained texture information among regions each having, as an apex, a feature point of a face by using the texture information obtained in step SP3 for each of the stereo images repeatedly input. Specifically, in step SP6, texture information obtained from a stereo image which was input in the past is held for each region, in the case where texture information of a region (unobtained region) which has not obtained texture information yet from a stereo image which was input in the past is newly obtained from a newly input stereo image in step SP3, the texture information is held as texture information of the region.

In step SP7, model perfection level Hp of an individual model is calculated on the basis of the reliability evaluation value $H^{(j)}$ indicative of reliability of the face information (the three-dimensional coordinates at each feature point in the face) calculated in step SP5. Specifically, the model perfection level Hp of an individual model is calculated by accumulating the reliability evaluation values $H^{(j)}$ at the feature points in the stereo images in time series as shown by Equation (6), and further adding the reliability evaluation values at all of feature points.

$$Hp = \sum_{j=1}^{N} \sum_{ti=0} H^{(j)}(ti) \quad (6)$$

As described above, the model perfection level $H^{(j)}$ calculated on the basis of the reliability evaluation values $H^{(j)}$ of three-dimensional coordinates at the feature points can be also expressed as an evaluation value indicative of reliability of three-dimensional shape information extracted from an individual model in step SP11 which will be described later.

In step SP8, whether the face information generating process is finished and the model fitting process as the following step and similarity calculating process as subsequent process are started (executed) or not is determined. As a determining method, a method of determining whether the model perfection level Hp exceeds a preset threshold TH1 or not can be employed. By the method, measurement information (input information) can be repeatedly obtained until face information (corrected face information) necessary for the required authentication accuracy is generated. Unstable authentication based on insufficient face information can be avoided. After the required face information (corrected face information) is generated, the system immediately shifts to the following process, so that authentication with high time efficiency at the required authentication accuracy can be performed.

As described above, in the face information generation process (steps SP1 to SP8), by sequentially updating the face information on the basis of stereo images captured repeatedly at different timings, the very reliable face information (corrected face information) EB2 can be generated.

Next, processes executed in steps SP9 to SP12 will be described. In the steps SP9 to SP12, feature information adapted to authentication (also called "authentication information") is generated on the basis of the corrected face information EB2 and the like.

The processes executed in steps SP9 to SP12 will be described in detail hereinbelow.

In the following step SP9, model fitting is performed using the corrected face information EB2. The "model fitting" is a process of generating an "individual model" in which measurement information of the face of the person HMb to be authenticated is reflected by modifying a "standard model (of a face)" as a prepared stereoscopic model of a general (standard) face by using the face information (corrected face information) of the person HMb to be authenticated. Concretely, a process of changing three-dimensional information of the standard model by using the calculated corrected three-dimensional coordinates $Mm^{(j)}$ and a process of changing two-dimensional information of the standard model by using the texture information are performed.

Figure 14:
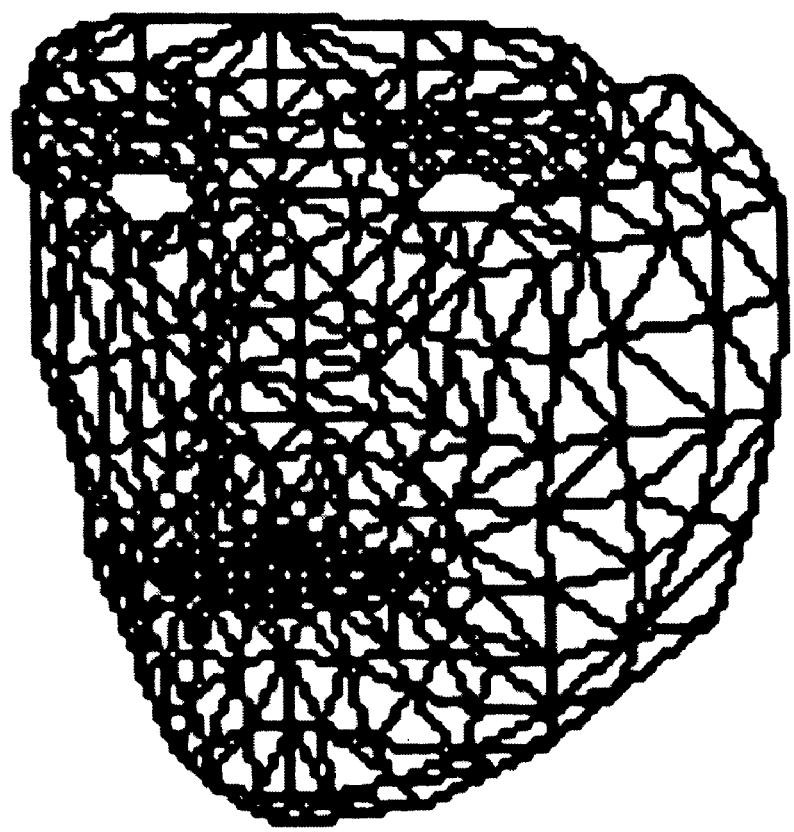
FIG. 14 is a diagram showing a standard model of a three-dimensional face.
Figure 15:
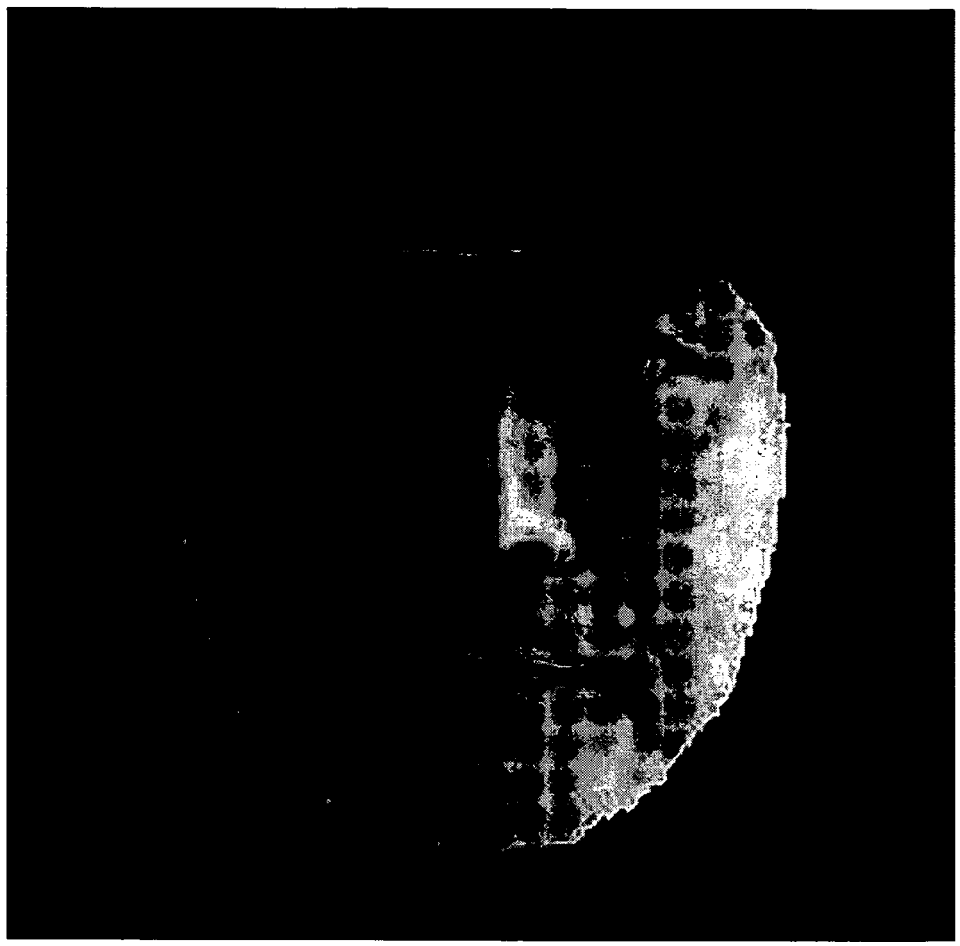
FIG. 15 is a diagram showing texture information.

FIG. 14 is a diagram showing a standard model of a three-dimensional face. FIG. 15 is a diagram showing texture information.

The standard model of a face shown in FIG. 14 is constructed by vertex data and polygon data and stored as the three-dimensional model database 32 (FIG. 5) in the storage 3 or the like. The vertex data is a collection of coordinates of a vertex (hereinbelow, also called "standard control point") COj of a feature part in the standard model and corresponds to the corrected three-dimensional coordinates at each feature point Qj calculated in step SP6 in a one-to-one correspondence manner. The polygon data is obtained by dividing the surface of the standard model into small polygons (for example, triangles) and expressing the polygons as numerical value data. FIG. 14 shows the case where the vertex of a polygon is constructed also by an intermediate point other than the standard control point COj. The coordinates at an intermediate point can be obtained by a proper interpolating method.

The model fitting for constructing an individual model from a standard model will now be described specifically.

First, the vertex (standard control point COj) of each of feature parts of the standard model is moved to a feature point calculated in step SP4. Concretely, the corrected three-dimensional coordinate value at each feature point Qj is substituted as a three-dimensional coordinate value of the corresponding standard control point COj, thereby obtaining a standard control point (hereinbelow, also called "individual control point") Cj after movement. In such a manner, the standard model can be modified to an individual model expressed by the corrected three-dimensional coordinates $Mm^{(j)}$.

From the movement amount of each vertex by modification (movement), the scale, tilt, and position of an individual model in the case where the standard model is used as a reference, used in step SP10, can be obtained. Concretely, a positional change of the individual model with respect to the standard model can be obtained by a deviation amount between a predetermined reference position in the standard model and a corresponding reference position in an individual model modified. From a deviation amount between a reference vector connecting predetermined two points in the standard model and a reference vector connecting points corresponding to the predetermined two points in the modified individual model, a change in the tilt and a scale change with respect to the standard model, of the individual model can be obtained. For example, by comparing the coordinates of a middle point QM between a feature point Q1 at the inner corner of the right eye and a feature point Q2 at the inner corner of the left eye with the coordinates at a point corresponding to the middle point QM in the standard model, the position of the individual model can be obtained. Further, by comparing the middle point QM with another feature point, the scale and tilt of the individual model can be calculated.

The following equation (7) expresses a transformation parameter (vector) vt expressing the correspondence relation between the standard model and the individual model. As shown in Equation (7), the transformation parameter (vector) vt is a vector having, as its elements, scale transformation index sz between the standard model and the individual model, transformation parameters (tx, ty, tz) indicative of translation displacements in three orthogonal axes, and translation parameters (φ, θ, ψ) indicative of a rotation displacement (tilt).

$$vt = (sz, \phi, \psi, \phi, tx, ty, tz)^T \tag{7}$$

where T expresses transposition. The definition will be the same in the following.

As described above, the process of changing the three-dimensional information of the standard model using the corrected three-dimensional coordinates $Mm^{(j)}$ related to the person HMb to be authenticated is performed.

After that, process of changing the two-dimensional information of the standard model by using the texture information is performed. Concretely, the texture information of each region using, as a vertex, a feature point of the face obtained from a stereo image in step SP3 and held in step SP6 is pasted (mapped) to corresponding regions (polygons) on the three-dimensional individual model. Each region (polygon) to which the texture information is pasted on a stereoscopic model (such as individual model) is also called a "patch".

As described above, the model fitting process (step SP9) is performed.

In the following step SP10, the individual model is corrected on the basis of the standard model as a reference. In the process, an alignment correction and a shading correction are made. The alignment correction is a correcting process for three-dimensional information, and the shading correction is a correcting process for two-dimensional information.

The alignment (face orientation) correction is performed on the basis of the scale, tilt, and position of the individual model using the standard model as a reference. More specifically, by performing coordinate conversion on the individual control point of the individual model using the conversion parameter vt (refer to Expression 7) indicative of the relation between the standard model as a reference and the individual model, a three-dimensional face model having the same posture as that of the standard model can be created. That is, by the alignment correction, the three-dimensional information of the person HMb to be authenticated can be properly normalized.

The shading correction is a process for correcting a brightness value (texture information (refer to FIG. 15)) of each of the pixels in a patch mapped to the individual model. By the shading correction, the difference in the texture information between the models (the standard model and the individual model) can be corrected, which occurs in the case where the positional relation between a light source and the subject at the time of capturing an image of a person for forming a standard model and that at the time of capturing an image of a person of the individual model (at the time of capturing an image of a person to be authenticated) are different from each other. That is, by the shading correction, the texture information as one of the two-dimensional information of the person to be authenticated can be normalized properly.

As described above, in the fluctuation correcting process (step SP10), information of the person HMb to be authenticated is generated in a normalized state as an individual model including both three-dimensional information and two-dimensional information of the person HMb to be authenticated.

In the following step SP11 (FIG. 8), as information indicative of features of the person HMb to be authenticated, three-dimensional shape information (three-dimensional information) and texture information (two-dimensional information) is extracted.

As the three-dimensional information, a three-dimensional coordinate vector of m pieces of the individual control points Cj in the individual model is extracted. Concretely, as shown in Expression (8), a vector $h^S$ (hereinbelow, also called "three-dimensional coordinate information") having, as elements, three-dimensional coordinates (Xj, Yj, Zj) of the m pieces of individual control points Cj (j=1, . . . , m) is extracted as the three-dimensional information (three-dimensional shape information).

$$h^s = (X1, \ldots, Xm, Y1, \ldots, Ym, Z1, \ldots, Zm)^T \qquad (8)$$

As the two-dimensional information, texture (brightness) information of a patch or a group (local area) of patches (hereinbelow, also called "local two-dimensional information") near a feature part, that is, an individual control point in the face, which is important information for person authentication is extracted. As the texture information (local two-dimensional information), information mapped to the sub model is used.

Figure 16:
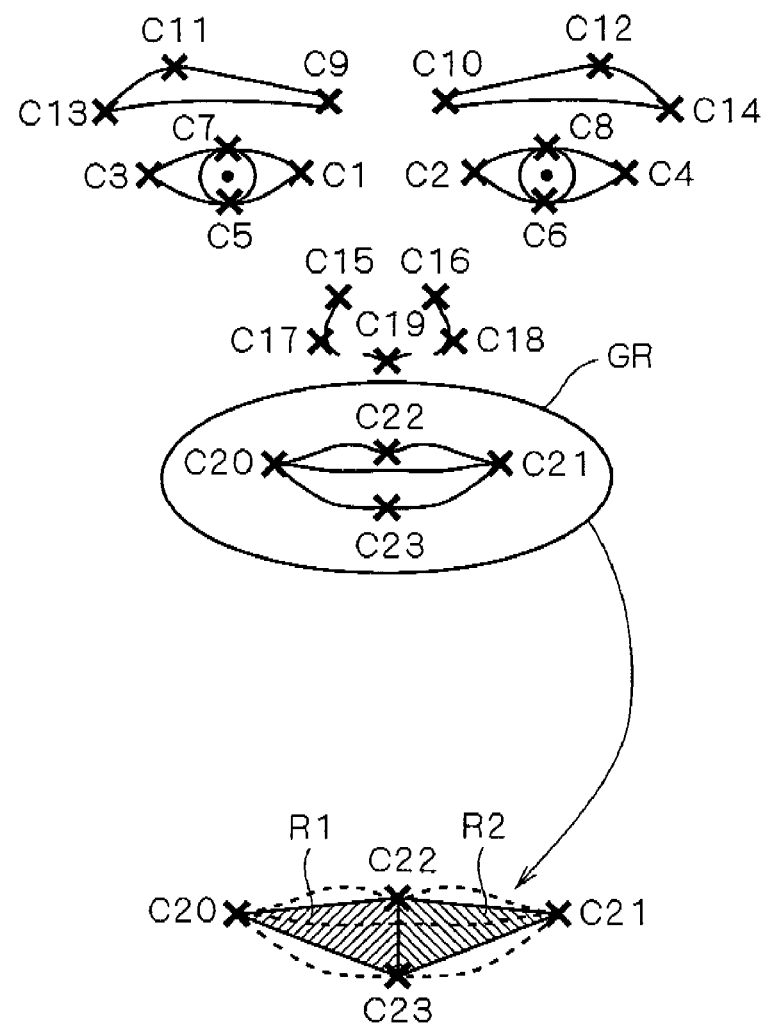
FIG. 16 is a diagram showing individual control points of a feature region after normalization.

The local two-dimensional information is comprised of, for example, brightness information of pixels of local areas such as an area constructed by a group GR in FIG. 16 indicative of individual control points of a feature part after normalization (a patch R1 having, as vertexes, individual control points C20, C22, and C23 and a patch R2 having, as vertexes, individual control points C21, C22, and C23), an area constructed only by a single patch, or the like. The local two-dimensional information $h^{(k)}$ (k=1, . . . , and L: L denotes the number of local areas) is expressed in a vector form as shown by Expression (9) when the number of pixels in the local area is n and brightness values of the pixels are BR1, . . . , and BRn.

Information obtained by collecting the local two-dimensional information $h^{(k)}$ in L local areas is also expressed as overall two-dimensional information.

$$h^{(k)} = (BR1, \ldots, BRn)^T \qquad (9)$$

(k=1 . . . L)

As described above, in step SP11, the three-dimensional shape information (three-dimensional information) and the texture information (two-dimensional information) is extracted as information indicative of a feature of the individual model from the individual model.

In step SP12, information compressing process for converting the information extracted in step SP11 to information adapted to authentication is performed.

The information compressing process is performed by using similar methods on the three-dimensional shape information $h^S$ and each local two-dimensional information $h^{(k)}$. The case of performing the information compressing process on the local two-dimensional information $h^{(k)}$ will be described in detail.

The local two-dimensional information $h^{(k)}$ can be expressed in a basis decomposition form as shown by Expression (10) using average information (vector) $h_{ave}^{(k)}$ of the local area preliminarily obtained from a plurality of sample face images and a matrix $P^{(k)}$ (which will be described below) expressed by a set of eigenvectors of the local area preliminarily calculated by performing KL expansion on the plurality of sample face images. As a result, local two-dimensional face information (vector) $c^{(k)}$ is obtained as compression information of the local two-dimensional information $h^{(k)}$.

$$h^{(k)} = h_{ave}^{(k)} + P^{(k)} c^{(k)} \qquad (10)$$

As described above, the matrix $P^{(k)}$ in Expression (10) is calculated from a plurality of sample face images. Concretely, the matrix $P^{(k)}$ is calculated as a set of some eigenvectors (basis vectors) having large eigenvalues among a plurality of eigenvectors obtained by performing the KL expansion on the plurality of sample face images. The basis vectors are stored in the compressed information storage 33. When a face image is expressed by using, as basis vectors, eigenvectors showing greater characteristics of the face image, the features of the face image can be expressed efficiently.

For example, the case where local two-dimensional information $h^{(GR)}$ of a local area constructed by a group GR shown in FIG. 16 is expressed in a basis decomposition form will be considered. When it is assumed that a set P of eigenvectors in the local area is expressed as P=(P1, P2, P3) by three eigenvectors P1, P2, and P3, the local two-dimensional information $h^{(GR)}$ is expressed as Expression (11) using average information $h_{ave}^{(GR)}$ of the local area and three eigenvectors P1, P2, and P3. The average information $h_{ave}^{(GR)}$ is a vector obtained by averaging a plurality of pieces of local two-dimensional information (vectors) of various sample face images on each corresponding factor. As the plurality of sample face images, it is sufficient to use a plurality of standard face images having proper variations.

$$h^{(GR)} = h_{avg}^{(GR)} + (P1 \ P2 \ P3) \begin{pmatrix} c1 \\ c2 \\ c3 \end{pmatrix} \qquad (11)$$

Expression (11) shows that the original local two-dimensional information can be reproduced by face information $c^{(GR)} = (c1, c2, c3)^T$. Specifically, it can be said that the face information $c^{(GR)}$ is information obtained by compressing the local two-dimensional information $h^{(GR)}$ of the local area constructed by the group GR.

Although the local two-dimensional face information $c^{(GR)}$ obtained as described above can be used as it is for authentication, in the embodiment, the information is further compressed. Concretely, a process of converting a feature space expressed by the local two-dimensional face information $c^{(GR)}$ to a subspace which increases the differences among persons is performed in addition. More specifically, a transformation matrix A is considered which reduces the local two-dimensional face information $c^{(GR)}$ of vector size "f" to the local two-dimensional feature amount (vector) $d^{(GR)}$ of vector size "g" as shown by Expression (12). As a result, the feature space expressed by the local two-dimensional face information $c^{(GR)}$ can be converted to a subspace expressed by the local two-dimensional feature amount $d^{(GR)}$. Thus, the differences among persons are made conspicuous.

$$d^{(GR)} = A^T c^{(GR)} \tag{12}$$

The transformation matrix A is a matrix having the size of f×g. By selecting "g" pieces of main components having high ratio (F ratio) between within-class variance and between-class variance from the feature space by using multiple discriminant analysis (MDA), the transformation matrix A can be determined.

By executing processes similar to the information compressing process performed on the local two-dimensional information $h^{(GR)}$ on all of the other local areas, local two-dimensional face feature amounts $d^{(k)}$ of the local areas can be obtained. By applying a similar method also to the three-dimensional shape information $h^S$, a three-dimensional face feature amount ds can be obtained.

A face feature amount "d" obtained by combining the three-dimensional face feature amount $d^S$ and the local two-dimensional face feature amount $d^{(k)}$ calculated in the step SP12 can be expressed in a vector form by Expression (13).

$$d = \begin{pmatrix} d^S \\ d^{(j)} \\ \vdots \\ d^{(L)} \end{pmatrix} \tag{13}$$

As described above, in steps SP9 to SP12, the face feature amount "d", that is, the feature information of the person HMb to be authenticated is obtained from input face images of the person HMb to be authenticated.

In the following steps SP13 and SP14, face authentication of the person HMb to be authenticated is performed using the information EC2 of the person to be authenticated (the face feature amount "d" or the like).

Concretely, overall similarity Re as similarity between the person HMb to be authenticated and the person HMa to be compared (a person to be registered) is calculated (step SP13). After that, a comparing operation between the person HMb to be authenticated and the person to be compared on the basis of the overall similarity Re is performed (step SP14). The overall similarity Re is calculated using weight factors specifying weights on three-dimensional similarity $Re^S$ and local two-dimensional similarity $Re^{(k)}$ (hereinbelow, also simply called "weight factors") in addition to the three-dimensional similarity $Re^S$ calculated from the three-dimensional face feature amount $d^S$ and local two-dimensional similarity $Re^{(k)}$ calculated from the local two-dimensional face feature amount $d^{(k)}$. As weight factors WT and WS in the embodiment, predetermined values are used. The processes in steps SP13 and SP14 will be described in detail hereinbelow.

In step SP13, similarity evaluation is conducted between the face feature amount (comparison feature amount) of a person to be compared, which is pre-registered in the person information storage 34 and the face feature amount of the person HMb to be authenticated, which is calculated in the steps SP1 to SP12. Concretely, the similarity calculation is executed between the registered face feature amount (comparison feature amount) ($d^{SM}$ and $d^{(k)M}$) and the face feature amount ($d^{SI}$ and $d^{(k)I}$) of the person HMb to be authenticated, and the three-dimensional similarity $Re^S$ and the local two-dimensional similarity $Re^{(k)}$ is calculated.

The face feature amount of the person to be compared (the person HMa to be registered) in face authentication is preliminarily obtained in the face registration system SYS1 executed prior to the operation of the face verification system SYS2.

The three-dimensional similarity $Re^S$ between the person HMb to be authenticated and the person to be compared is obtained by calculating Euclidean distance $Re^S$ between corresponding vectors as shown by Equation (14).

$$Re^S = (d^{SI} - d^{SM})^T (d^{SI} - d^{SM}) \tag{14}$$

The local two-dimensional similarity $Re^{(k)}$ is obtained by calculating Euclidean distance $Re^{(k)}$ of each of vector components of the feature amounts in the corresponding local regions as shown by Equation (15).

$$Re^{(k)} = (d^{(k)I} - d^{(k)M})^T (d^{(k)I} - d^{(k)M}) \tag{15}$$

As shown in Equation (16), the three-dimensional similarity $Re^S$ and the local two-dimensional similarity $Re^{(k)}$ are combined by using weight factors WT and WS. In such a manner, the overall similarity Re as similarity between the person HMb to be authenticated and the person to be compared (person HMa to be registered) is obtained.

$$Re = WT \cdot Re' + WS \cdot \sum_k Re^{(k)} \tag{16}$$

In step SP14, authentication determination is performed on the basis of the overall similarity Re. The authentication determining method varies between the case of face verification and the case of face identification as follows.

In face verification, it is sufficient to determine whether an input face (the face of the person HMb to be authenticated) is that of a specific registrant or not. Consequently, by comparing the overall similarity Re of the face feature amount of the specific registrant, that is, the person to be compared (comparison feature amount) with a predetermined threshold TH2, similarity between the person HMb to be authenticated and the person to be compared is determined. Specifically, when the overall similarity Re is smaller than the predetermined threshold TH2, the similarity between the person HMb to be authenticated and the person to be compared is high, and it is determined that the person HMb to be authenticated and the person to be compared are the same person.

On the other hand, the face identification is to identify a person as the owner of an input face (the face of the person HMb to be authenticated). In the face identification, similarity between the face feature amount of each of the persons registered and the face feature amount of the person HMb to be authenticated is calculated, thereby determining coincidence between the person HMb to be authenticated and each of the persons to be compared. The person to be compared having the highest coincidence among the plurality of persons to be compared is determined as the same person as the person HMb to be authenticated. Specifically, the person to be compared corresponding to the minimum similarity $Re_{min}$ among various similarities Re of the person HMb to be authenticated and a plurality of persons to be compared is determined as the same person as the person HMb to be authenticated.

As described above, in step SP14, the authentication determination is made on the basis of the overall similarity Re.

The controller 10b in the embodiment executes the authenticating operation to determine whether the person to be compared is the same person as the person to be authenticated or not in consideration of both of the model perfection level Hp and the overall similarity Re in the processes of the steps SP1 to SP14. By using the model perfection level Hp in which reliability of face information (corrected face information) is reflected in addition to the overall similarity Re for the authenticating operation, accurate authentication in which the reliability of information used for authentication is also reflected can be performed.

When the model perfection level Hp is lower than the threshold TH1, the process does not proceed into step SP9 and the subsequent steps. On condition that when the person HMb to be authenticated and the person HMa to be compared are not determined as the same person and the model perfection level Hp is higher than the threshold TH1, the persons HMb and HMa are determined as the same person. Specifically, in the embodiment, when the model perfection level Hp is higher than the threshold TH1 in step SP8 and the overall similarity Re is lower than the threshold TH2 in step SP14, the persons HMb and HMa are determined as the same person. In other words, when the model perfection level Hp is lower than the threshold TH1, the person HMb to be authenticated and the person HMa to be compared are not determined as the same person. Consequently, the accurate authenticating operation in which reliability of face information used for authentication is sufficiently reflected can be performed.

In the embodiment, the model perfection level Hp and the overall similarity Re are considered as follows. The condition that the model perfection level Hp exceeds the threshold TH1 is used as the condition of executing the similarity calculating operation. When the model perfection level Hp exceeds the threshold TH1, the similarity calculating operation (step SP13) is executed. Consequently, accurate authenticating operation in which the reliability of the information used for authentication is also sufficiently reflected can be performed. When model perfection level is lower than the threshold TH1, the similarity calculating operation is not executed, so that unstable authentication can be avoided.

Further, on condition that the model perfection level Hp exceeds the threshold TH1, the operation of extracting the feature information of the person HMb to be authenticated from the individual model (step SP11) is executed. Therefore, when the model perfection level Hp is less than the threshold TH1, the extracting operation is not executed, so that unstable authentication can be avoided.

Although the predetermined threshold TH1 is used for comparison with the model perfection level Hp in the embodiment, the threshold TH1 may be set according to an authentication level (authentication accuracy) required for the face authentication system 1A. For example, in the case of printing confidential document by a copy machine as described above, from the viewpoint of security protection, the authentication accuracy required for the face authentication system 1A is relatively high, and the predetermined threshold TH1 is set to a relatively large value. As a result, also in the situation of use in which high-accuracy authentication is required like the case of printing confidential document, high-accuracy authentication can be achieved. On the other hand, in the authenticating operation executed to display an operation panel dedicated to a specific person in the copying machine, high authentication accuracy is not requested for the face authentication system 1A, so that the predetermined threshold TH1 is set to a relatively small value.

By setting the threshold TH1 in accordance with the required authentication level, at the time of generating an individual model of the person HMb to be authenticated, face information is obtained repeatedly until an individual model corresponding to the requested authentication level (authentication accuracy) is generated. Consequently, information acquisition and authentication according to required authentication accuracy can be realized. The authenticating operation can be performed according to various scenes such as the case where high authentication level is not required but high authentication speed is required or the case where high authentication speed is not required but high-accuracy authentication is required.

Further, in the case where the person HMb to be authenticated and the person HMa to be compared are determined as the same person, when it is determined that the model perfection level Hp (also expressed as Hpb) of the person HMb to be authenticated is higher than the model perfection level Hp (also expressed as Hpa) of the person HMa to be compared, the controller 10b in the embodiment updates and registers the feature information of the person HMb to be authenticated as feature information of the person HMa to be compared. That is, the controller 10b updates the registrant information EC1 by performing the processes (steps SP15 to SP18) as shown in FIG. 9.

To be concrete, in the following steps SP15 to SP18, the model perfection level included in the registrant information EC1 of the person to be compared determined as the same person as the person HMb to be authenticated in step SP14 is compared with the model perfection level included in the information EC2 of the person HMb to be authenticated, which is generated by the controller 10b. Which one of the information is more proper as authentication information is determined, and the registrant information EC1 is updated.

Specifically, in the case where a person to be compared who is determined as the same person as the person HMb to be authenticated exists in the authentication determination in step SP14, the process proceeds into step SP16 (step SP15).

In step SP16, the model perfection level Hp included in the information EC2 of the person to be authenticated (that is, the model perfection level Hpb of the person HMb to be authenticated) is compared with the model perfection level Hp included in the registrant information EC1 of the person to be compared who is determined as the same person (that is, the model perfection level Hpa of the person HMa to be authenticated).

When it is determined that the model perfection level Hpb included in the information EC2 of the person to be authenticated is higher than the model perfection level Hpa included in the registrant information EC1 (step SP17), the registrant information EC1 registered in the person information storage 34 is changed (updated) (step SP18). That is, the process of changing (updating) the registrant information EC1 registered in the person information storage 34 to the information EC2 of the person to be authenticated is performed.

By such a process, authentication information of higher accuracy can be assured in the person information storage 34 each time the authenticating operation is performed. Thus, improvement in authentication accuracy can be expected.

On the other hand, in the case where it is determined in step SP15 that a person to be compared who is the same as the person to be authenticated does not exist, or in the case where it is determined in step SP17 that the registrant information EC1 is not updated, the registrant information EC1 is not updated and is held as it is in the person storage 34.

As described above, after completion of the authentication determination, the registrant information used for the authentication is compared with the authenticator information, and the registrant information EC1 is changed (updated). Consequently, each time the authenticating operation is performed, information of higher accuracy can be assured in the person information storage 34.

Operation of Face Registration System SYS1

Next, the operation of the face registration system SYS1 will be described. Concretely, the case of registering a predetermined person photographed by the cameras CA1 and CA2 as the person HMa to be registered will be described. Three-dimensional shape information measured on the basis of the principle of triangulation using images captured by the cameras CA1 and CA2 is used as the three-dimensional information, and texture (brightness) information is used as the two-dimensional information. In the following description, the points different from the operation of the face verification system SYS2 will be described mainly. The same reference numerals are designated to common parts and their description will not be repeated.

As shown in FIG. 1, in the controller 10a in the face registration system SYS1, on the basis of the stereo images (measurement information) EA1 of the person HMa to be registered which are repeatedly captured at different timings, the feature information of the person HMa to be registered and the model perfection level of the individual model GM1 is obtained and registered as the registrant information EC1 of the person HMa to be registered in the person information storage 34. The registrant information EC1 registered in the person information storage 34 is used at the time of authentication in the face verification system SYS2 and the like.

Figure 17:
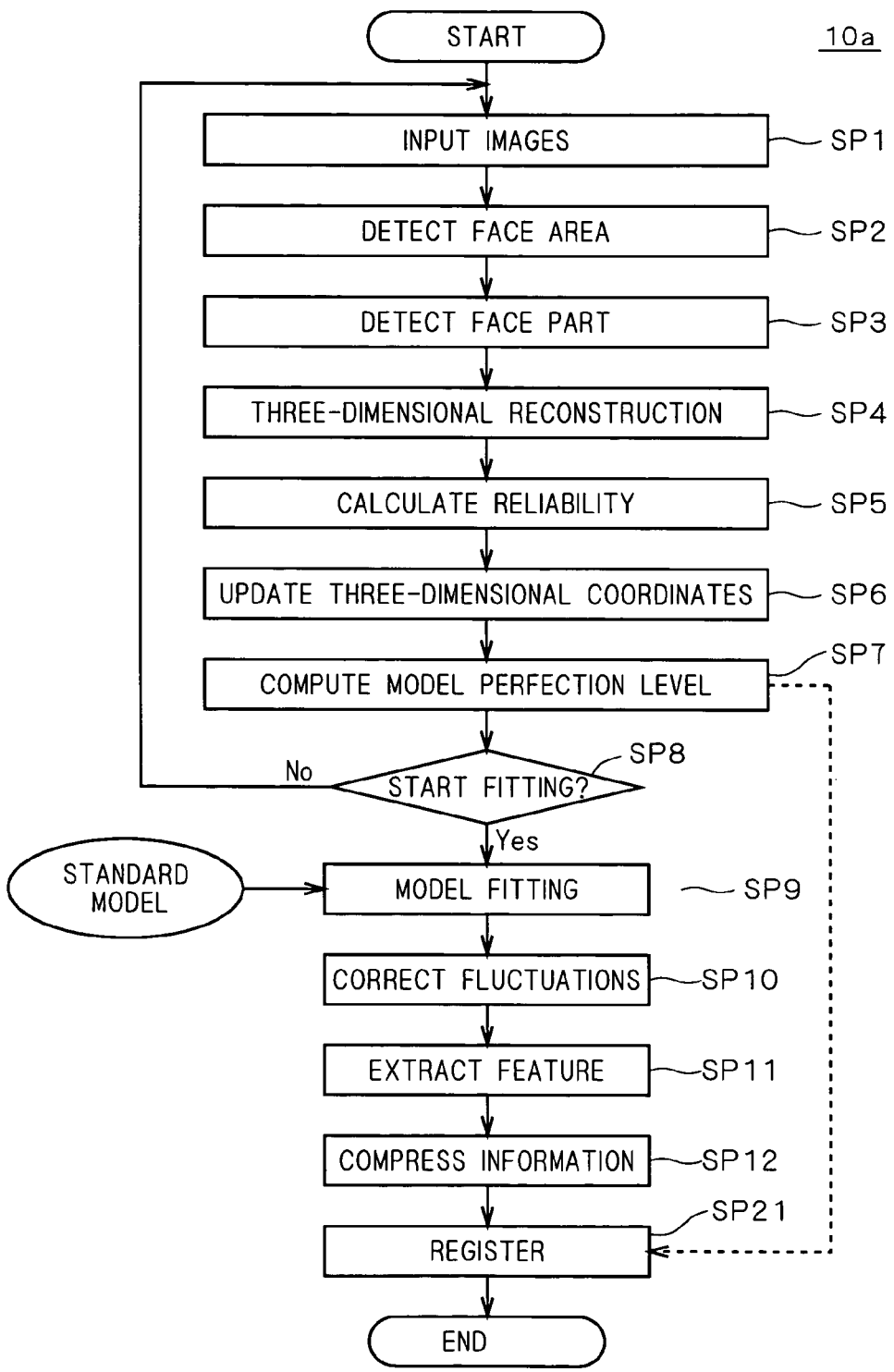
FIG. 17 is a flowchart showing generation operation of a controller in the face registration system.

In the following, general operation of the controller 10a in the face registration system SYS1 will be described specifically. FIG. 17 is a flowchart showing operations of the controller 10a in the face registration system SYS1.

As shown in FIG. 17, in the controller 10a, processes similar to the steps SP1 to SP12 are executed on the face images (verified images) of the person HMa to be registered which are captured repeatedly at different timings.

Concretely, three-dimensional coordinates at feature points in the face of the person HMa to be registered are calculated on the basis of stereo images (measurement information) obtained by sequentially (repeatedly) photographing the face of the person HMa to be registered at different time points (step SP6). On the basis of reliability of the three-dimensional coordinates at the feature points sequentially obtained in step SP4, the model perfection level Hp of the individual model is calculated in step SP7.

When it is determined in step SP8 that the face information (corrected face information) EB1 required for generation of the registrant information EC1 is obtained, the face information generating process (steps SP1 to SP8) is finished, and the process proceeds into step SP9.

In the following step SP9, an individual model is generated from a standard model of a face on the basis of three-dimensional coordinates at the feature points in the face. In step SP10, a fluctuation correction in the individual model is executed. In step SP11, three-dimensional shape information (three-dimensional information) and texture information (two-dimensional information) is extracted from the corrected individual model. The resultant information is further subjected to step SP12, thereby obtaining a face feature amount (feature information) d of the person HMa to be registered.

In step SP21, the generated feature information (face feature amount d) of the person HMa to be registered and the model perfection level Hp of the individual model from which the face feature amount d is extracted is registered as information used for authentication (registrant information EC1) into the person information storage 34.

The registrant information EC1 of the person HMa to be registered which is registered in the person information storage 34 in the face registration system SYS1 is used for the authenticating operation in the face verification system SYS2. In the face verification system SYS2 using information for face authentication, the feature information extracted from the individual model and the model perfection level Hp based on the reliability of the face information is registered as information for face authentication on the person HMa to be registered. Therefore, in the authentication using the information for face authentication, after performing the operation of comparing the model perfection level Hpb of the person HMb to be authenticated with the model perfection level Hpa of the person HMa to be registered, operation of updating the model perfection level Hpa of the person HMa to be registered can be performed, and high-accuracy authentication in which reliability of face information is reflected can be realized.

2. Second Embodiment

Next, a second embodiment will be described. The configuration of the face authentication system 1B in the second embodiment is similar to that in the first embodiment. The same reference numerals are designated to elements having functions similar to those in the first embodiment and their description will not be repeated.

In the foregoing first embodiment, the face information EB1 (or EB2) according to required authentication accuracy is generated on the basis of stereo images repeatedly obtained at different timings, and the model fitting process is performed by using the face information EB1 (or EB2). In the second embodiment, the case of generating (updating) face information each time a stereo image is input and, each time the face information is updated, executing the model fitting process by using the face information to update the model will be described.

Face Verification System SYS2

Figure 18:
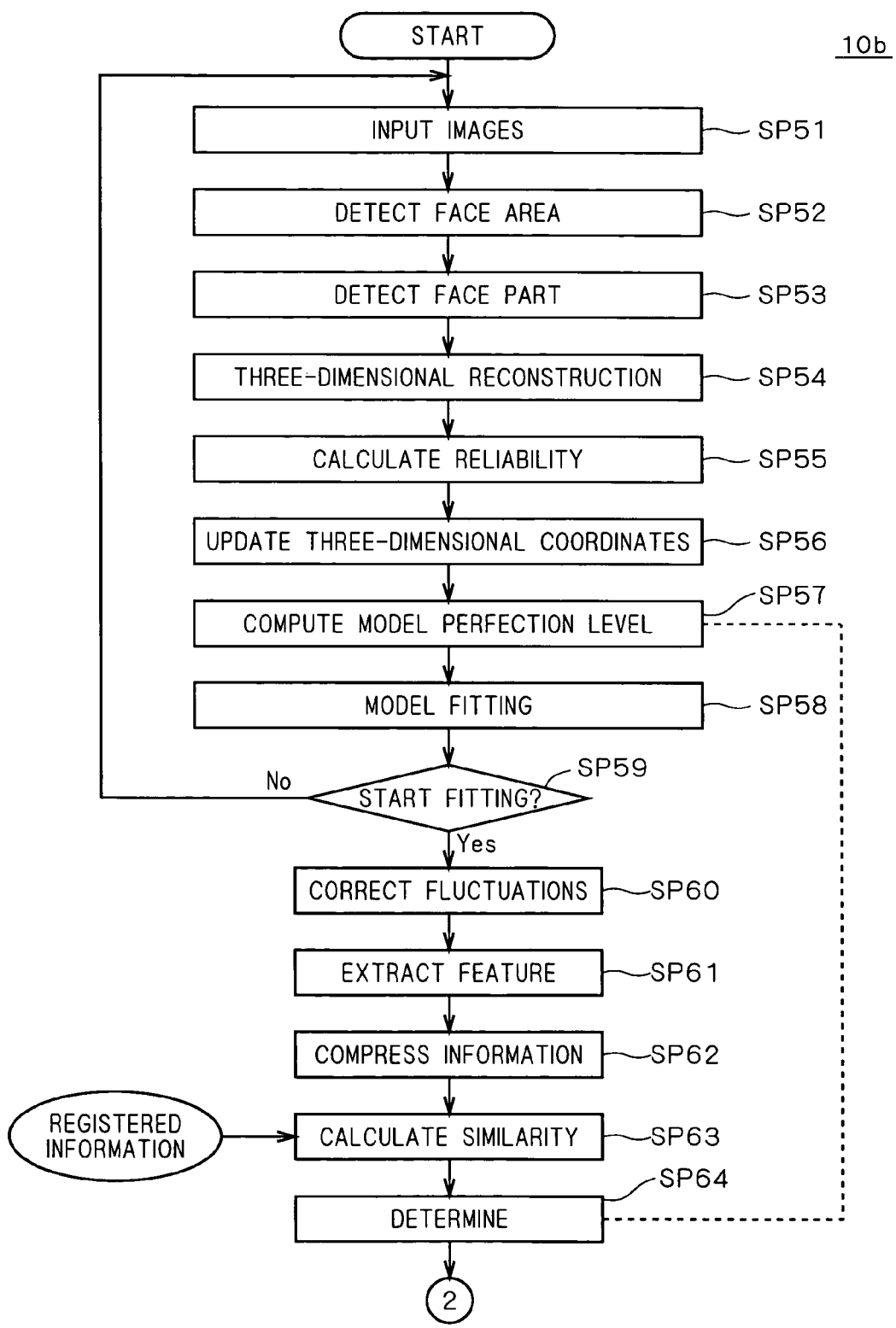
FIG. 18 is a flowchart showing operation of a controller in a face authentication system of a second embodiment.
Figure 19:
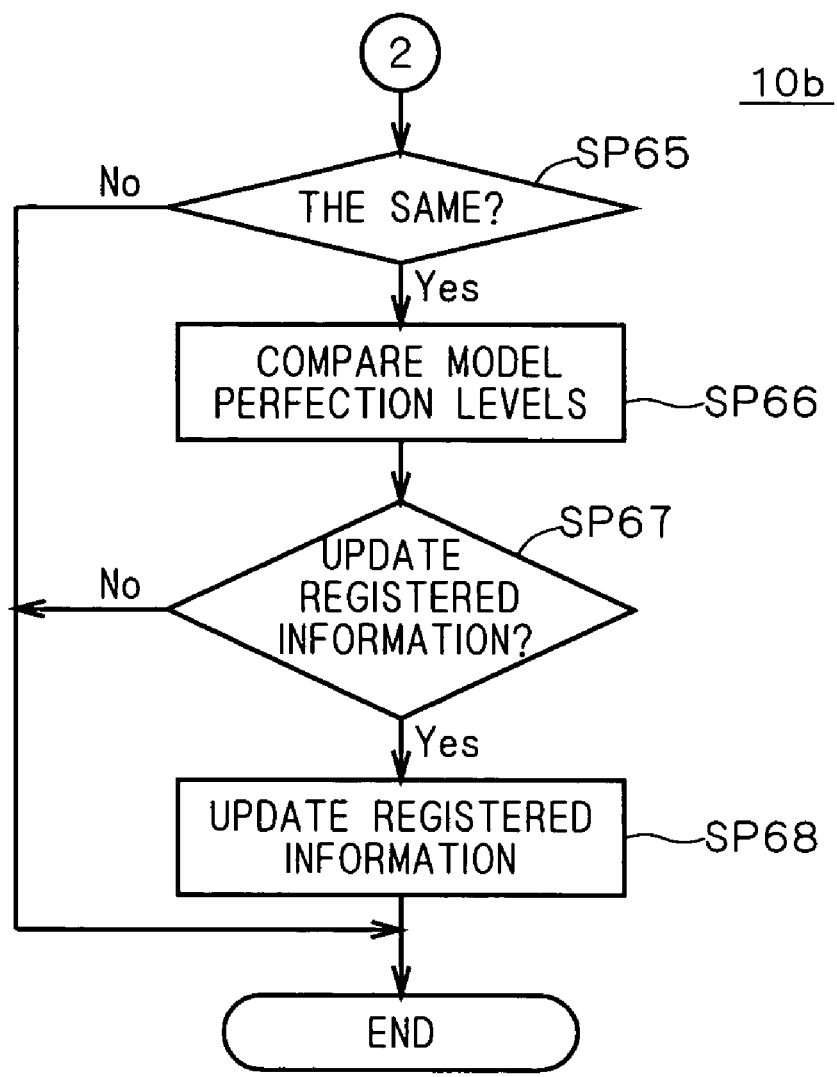
FIG. 19 is a flowchart showing operation of the controller in the face authentication system of the second embodiment.

FIGS. 18 and 19 are flowcharts showing operations of the controller 10b in the face verification system SYS2 in the second embodiment.

First, as shown in FIG. 18, in steps SP51 to SP57, processes similar to the steps SP1 to SP7 are performed. Briefly, face information is generated for each of stereo images of the person HMb to be authenticated which are input repeatedly at different timings (step SP54), and update of face information in which face information generated in the past is reflected is sequentially executed (step SP56). In step SP57, on the basis of the reliability of the three-dimensional coordinates at each of the feature points sequentially obtained in step SP55, the model perfection level Hp of an individual model is calculated.

In step SP58, on the basis of the face information (corrected face information) generated sequentially (successively) in step SP56, the model is updated by the model fitting each time (successively). In the model fitting, a process of updating three-dimensional information and a process of updating two-dimensional information are performed as described above. As the model fitting method, a method similar to that in the first embodiment may be used. In step SP58 in the second embodiment, model fitting in which movement of a semi-control point CSv (which will be described later) newly set for the standard model is also considered is performed. The process of changing two-dimensional information is performed in a manner similar to that in the first embodiment.

In the following step SP59 (FIG. 18), the continuous model updating process in steps SP51 to SP58 is finished and whether the process proceeds into the next process (step SP60) or not is determined. As the determining method, a method similar to that of the step SP8, that is, a method of determining whether the model perfection level Hp exceeds the preset threshold TH1 or not can be employed. By the method, until an individual model necessary for required authentication accuracy is generated, measurement information can be obtained repeatedly.

When it is determined in step SP59 that the processes in steps SP51 to SP58 are finished, the process proceeds into step SP60.

In steps SP60 to SP62, processes similar to those in the steps SP10 to SP12 (FIG. 8) are executed. Briefly, in step SP60, a fluctuation correction is executed on the individual model obtained in the processes in the steps SP51 to SP59. In step SP61, three-dimensional shape information (three-dimensional information) and texture information (two-dimensional information) is extracted from the corrected individual model. In step SP62, a predetermined information compressing process is executed, thereby generating the face feature amount (feature information) d of the person HMa to be authenticated.

In steps SP63 and SP64, processes similar to shoe in the steps SP13 and SP14 (FIG. 8) are executed, and face authentication of the person HMb to be authenticated is performed by using the information EC2 (such as the face feature amount (feature information) d) of the person HMa to be authenticated. Concretely, overall similarity Re as similarity between the person HMb to be authenticated and the person HMa to be compared (person HMa to be registered) is calculated (step SP13). After that, a comparing operation (authentication determination) between the person HMb to be authenticated and the person to be compared is performed on the basis of the overall similarity Re (step SP14).

Further, in steps SP65 to SP68 shown in FIG. 19, processes similar to those of the steps SP15 to SP18 are executed. Briefly, the model perfection level Hpa included in the registrant information EC1 of the person to be compared determined as the same person as the person HMb to be authenticated is compared with the model perfection level Hpb included in the information EC2 of the person HMb to be authenticated, which is generated by the controller 10b, and the registrant information EC1 registered in the person information storage 34 is changed (updated).

Figure 20:
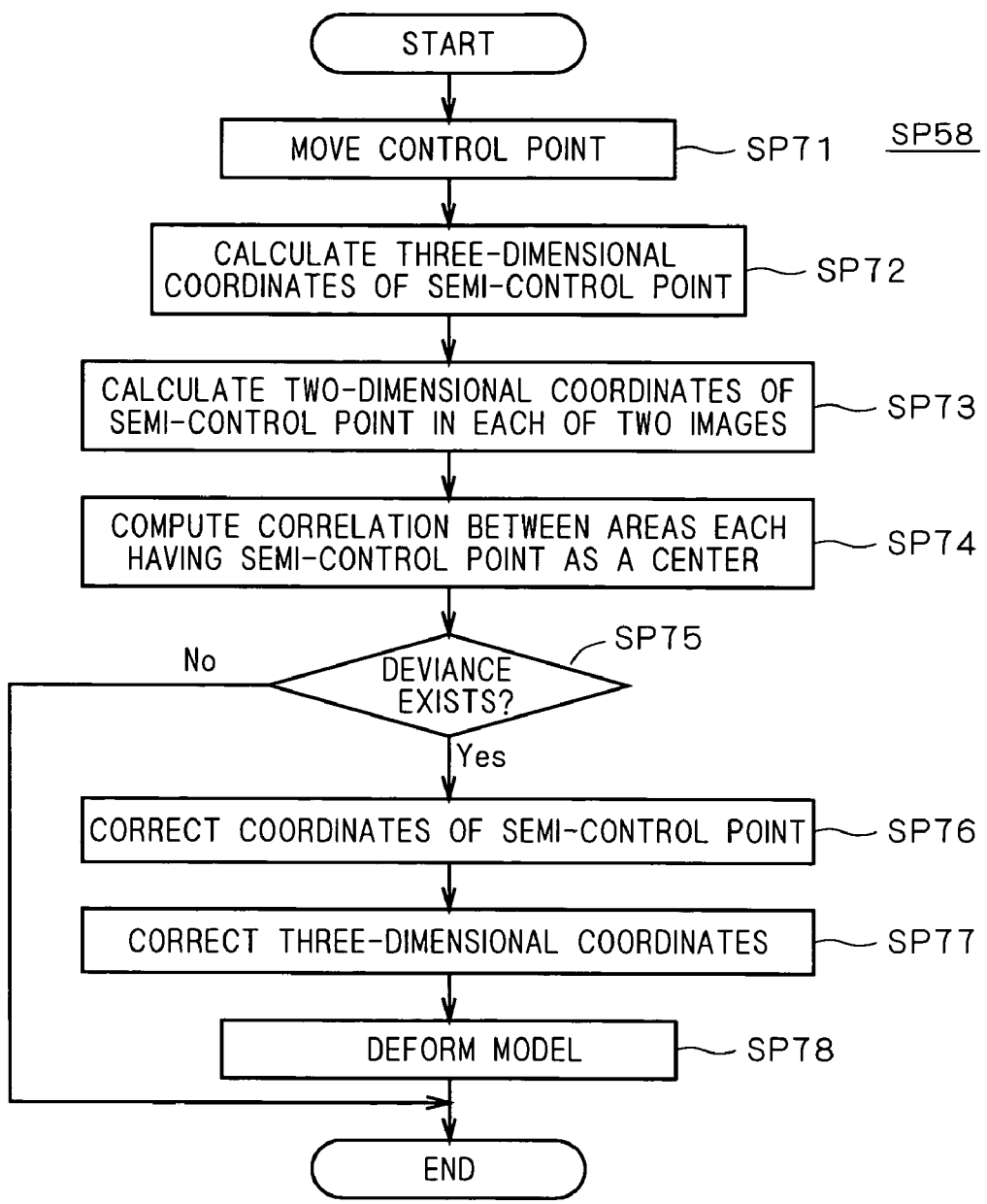
FIG. 20 is a flowchart showing model fitting in which semi-control point is considered.
Figure 21:
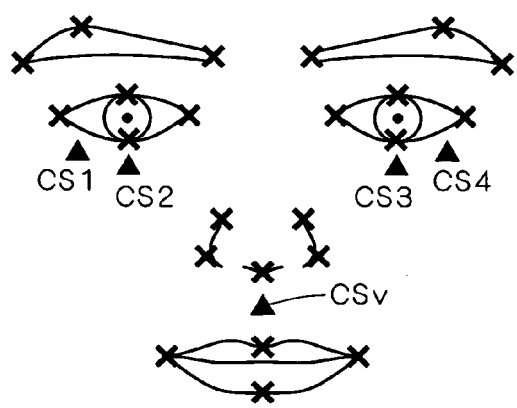
FIG. 21 is a diagram showing semi-control points on a standard model.
Figure 22:
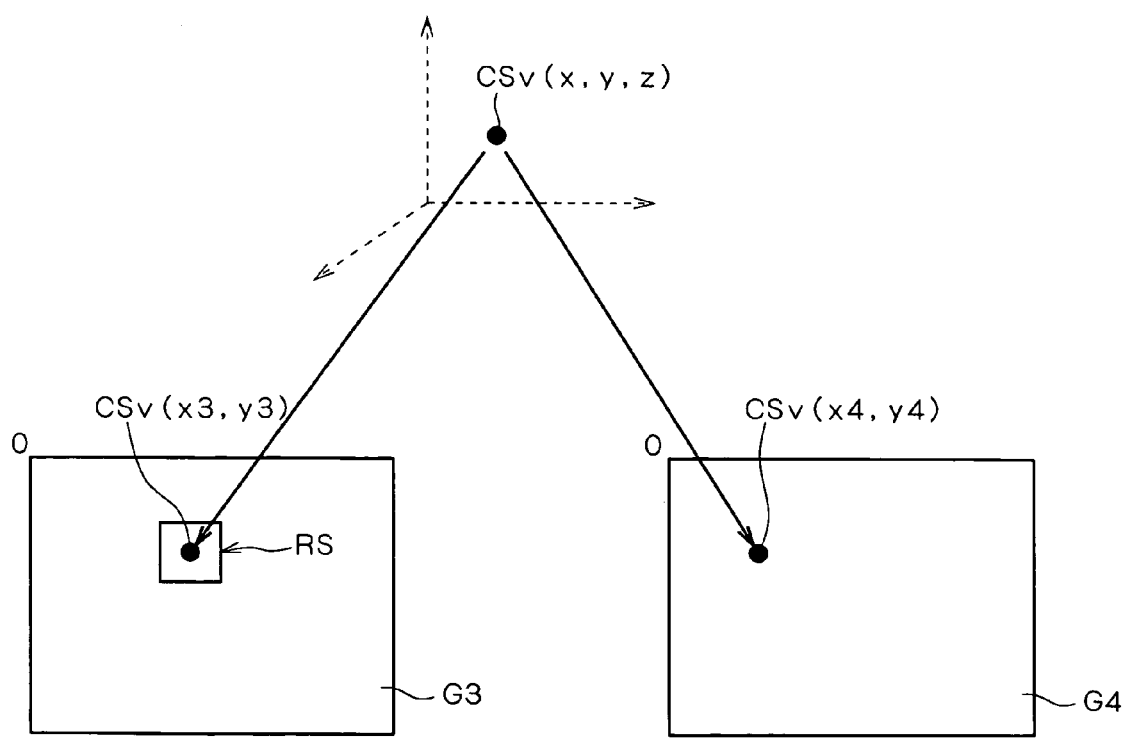
FIG. 22 is a diagram showing correspondence between a three-dimensional position in an individual model of semi-control point and two-dimensional positions of semi-control point on two images.

The model fitting (step SP58) in which the semi-control point CSv is considered and which is executed in the step SP58 in the second embodiment will be described specifically. FIG. 20 is a flowchart showing the model fitting in which the semi-control points are considered. FIG. 21 is a diagram showing semi-control points CSv on a standard model. FIG. 22 is a diagram showing correspondence between a three-dimensional position in an individual model of semi-control points and a two-dimensional position on two images.

The semi-control point CSv is a point which is useful as individual identification information like a wrinkle appearing below an eye or between the nose and the mouth but is provided in a portion whose position is difficult to be specified more than the standard control point COj. By newly setting such a semi-control point CSv to a standard model and performing model fitting, the position of an intermediate point other than the standard control points COj in the individual model can be finely adjusted. "v" indicates the number of semi-control points.

The model fitting in which the semi-control points CSv are considered is realized by performing processes in steps SP71 to SP78 shown in FIG. 20.

First, in step SP71, a control point is moved by a method similar to that in the first embodiment. Concretely, corrected three-dimensional coordinates $Mm^{(j)}$ of each of the feature points Qj updated in step SP56 are substituted as new three-dimensional coordinates for a corresponding individual control point Cj of an individual model generated by the model fitting of last time. As each of the individual control point Cj moves due to the substitution, each of the semi-control points CSv on the individual model also moves.

In the following step SP72, the three-dimensional coordinates of the semi-control point CSv moved in association with movement of the individual control point Cj are calculated by a proper interpolating method using the three-dimensional coordinates of each of the individual control points Cj.

In step SP73, two-dimensional coordinates of each of the semi-control points in the two images (in this case, the images G3 and G4) input in the step SP51 are calculated on the basis of the three-dimensional coordinates of each of the semi-control points CSv. Specifically, as shown in FIG. 22, by performing reverse operation using the equation (1) from the three-dimensional coordinates of the semi-control points CSv, the two-dimensional coordinates of the semi-control point CSv in each of the two images are calculated.

In the following step SP74, correlation value computation on a predetermined area using the semi-control point CSv as a center is performed between two images every semi-control point CSv.

Concretely, a predetermined area RS (for example, an area having 5×5 pixels) having the semi-control point CSv as a center on the image G3 is cut out and, while shifting the predetermined area RS by narrow width (for example, one pixel by one pixel) around the semi-control point CSv on the image G4, the correlation value computation is performed. Calculation of a correlation value is performed by using the equation (4), and an area including the position in which the correlation value is the largest, that is, the same part the most is specified.

In step SP75, the position in which the correlation value is the largest coincides with the position of the semi-control point CSv on the image G4 calculated in the step SP73 or not is determined. If YES, the model fitting is finished. On the other hand, if NO, the process proceeds into step SP76.

In the step SP76, the coordinates of the semi-control point CSv on the image G4 are corrected. Concretely, a correction of setting the center position of the predetermined area RS in the position (coordinates) at which the correlation value is the largest on the image G4 as a two-dimensional coordinate position of the semi-control point CSv on the image G4 is made.

In step SP77, three-dimensional coordinates of the semi-control point CSv are newly calculated by using the equation (1) from the two-dimensional coordinates of the semi-control point CSv on the image G3 and the corrected two-dimensional coordinates of the semi-control point CSv on the image G4.

In step SP78, the three-dimensional coordinates of the semi-control point CSv newly calculated are substituted for the semi-control point CSv on the individual model, thereby deforming the model.

In such a manner, the model fitting in which movement of the semi-control point CSv is considered is performed. By such model fitting, an individual model in which the face shape of the person HMb to be authenticated is reflected more can be generated.

Face Registration System SYS1

Figure 23:
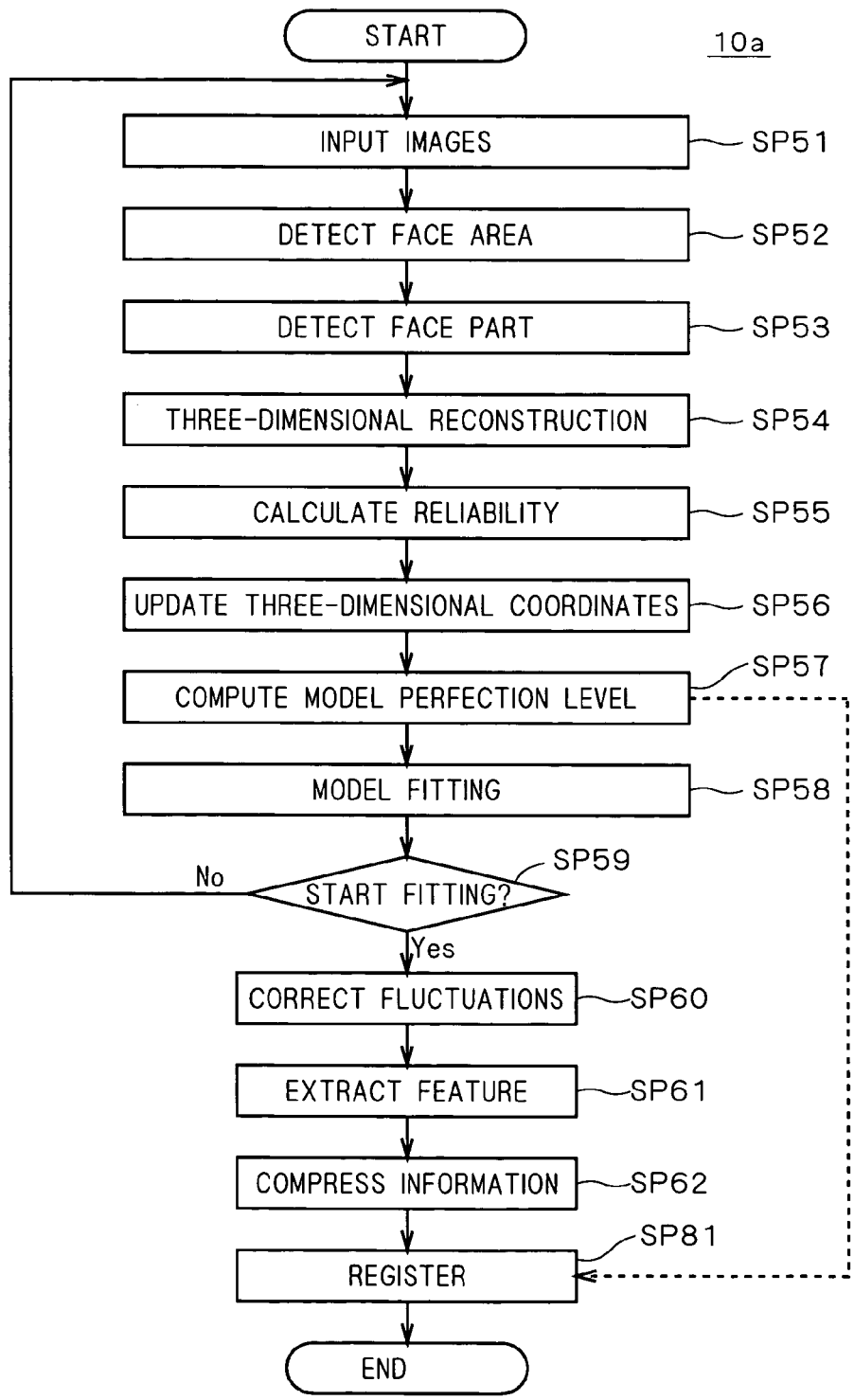
FIG. 23 is a flowchart showing operation of the controller in a face registration system of the second embodiment.

FIG. 23 is a flowchart showing operations of the controller 10a in the face registration system SYS1 of the second embodiment.

As shown in FIG. 23, in the controller 10a, processes similar to the steps SP1 to SP12 are executed on the basis of stereo images (registration images) of the person HMa to be registered which are repeatedly captured at different timings. The face feature amount "d" of the person HMa to be registered and the model perfection level Hp (obtained in the step SP57) of the individual model from which the face feature amount "d" is extracted are generated as the registrant information EC1.

In step SP81, a process similar to that in the step SP21 (FIG. 17) is performed. The generated feature information (face feature amount "d") of the person HMa to be registered and the generated model perfection level Hp is registered as information (registrant information EC1) used for the authenticating operation into the person information storage 34.

3. Modifications

Although the embodiments of the present invention have been described above, the invention is not limited to the foregoing description.

For example, in the foregoing embodiments, the process of determining shift to the next process (steps SP9 and SP60) is executed on the basis of the model perfection level Hp in steps SP8 and SP59, and the authentication determination is conducted on the basis of the overall similarity Re in steps SP14 and SP64. The invention, however, is not limited to the embodiment.

Concretely, without executing the shift determining process based on the model perfection level Hp in steps SP8 and SP59, when the model perfection level Hp is higher than the predetermined threshold TH1 and the overall similarity Re is smaller than the threshold TH2 in steps SP14 and SP64, the person HMb to be authenticated and the person HMa to be compared may be determined as the same person.

As described above, the authentication determination in which both of the model perfection level Hp and the overall similarity Re are considered may be executed in step SP14. In this case, as the method of determining the shift to the next process (steps SP9 and SP60) executed in the steps SP8 and SP59, various methods can be employed. For example, a method of determining whether shift to the next process (steps SP9 and SP60) is made or not depending on whether time lapsed from image capture start exceeds predetermined time or not may be used. Alternatively, the shift determination (steps SP8 and SP59) is not performed, but shift may be simply made to the next process (steps SP9 and SP60) each time a stereo image is input.

As described above, in the authentication determination in step SP14, the authenticating operation of executing an authentication determination in which both the model perfection level Hp and the overall similarity Re is considered is also expressed as an operation that when the model perfection level Hp is lower than the threshold TH1, the person HMb to be authenticated and the person HMa to be compared are not determined as the same person. Consequently, the accurate authenticating operation in which the reliability of face information used for authentication is sufficiently reflected can be realized.

In the foregoing embodiments, the case of determining whether the person HMb to be authenticated and the person HMa to be compared are the same or not by comparing the model perfection level Hp and the overall similarity Re with the corresponding reference values (thresholds) TH1 and TH2, respectively, has been described. The invention, however, is not limited to the case. For example, a function VH using both of the overall similarity Re and the model perfection level Hp as variables as shown in Equation (17) is set. In step SP14, when the value of the function VH exceeds the predetermined threshold TH3, it may be determined that the person HMb to be authenticated and the person HMa to be registered are the same person.

$$VH = r \cdot \frac{Hp}{Re} \tag{17}$$

where γ expresses a constant.

By such authentication determination, accurate authenticating operation in which the reliability of information used for authentication is also sufficiently reflected can be performed.

In the steps SP8 (FIG. 8) and SP59 (FIG. 18) of the controller 10b in the embodiment, when the model perfection level Hp exceeds the threshold TH1, the process automatically proceeds into the next process (steps SP9 and SP60). The invention is not limited to the embodiment.

Concretely, a mode of proceeding into the next process (steps SP9 and SP60) on receipt of a direct authentication instruction operation from the user may be used. More specifically, when the authentication instruction operation is not input, the process does not proceed into the next process (steps SP9 and SP60) but repeatedly executes the face information generating process (steps SP1 to SP8). When the authentication instruction is input, if the model perfection level at that time (just before or after the input) is lower than the predetermined threshold TH1, a signal (response) of authentication disable is sent back, and the face information generating process is repeated. If the model perfection level exceeds the predetermined value, the process may proceed into the next process (steps SP9 and SP60). As a result, a system having high response to whether authentication can be performed or not can be provided.

Although the case of determining the overall similarity Re by the equation (16) has been described in the embodiment, the invention is not limited to the case. For example, the inverse number in the right side of the equation (16) may be set as the overall similarity Re. In this case, when the overall similarity Re is higher than the predetermined threshold TH2, it is regarded that the degree of similarity between the person HMb to be authenticated and the person to be compared is high, and the person HMb to be authenticated and the person to be compared are determined as the same person. In this case, the function VH shown in the equation (17) is expressed by the product between the model perfection level Hp and the overall similarity Re.

Figure 24:
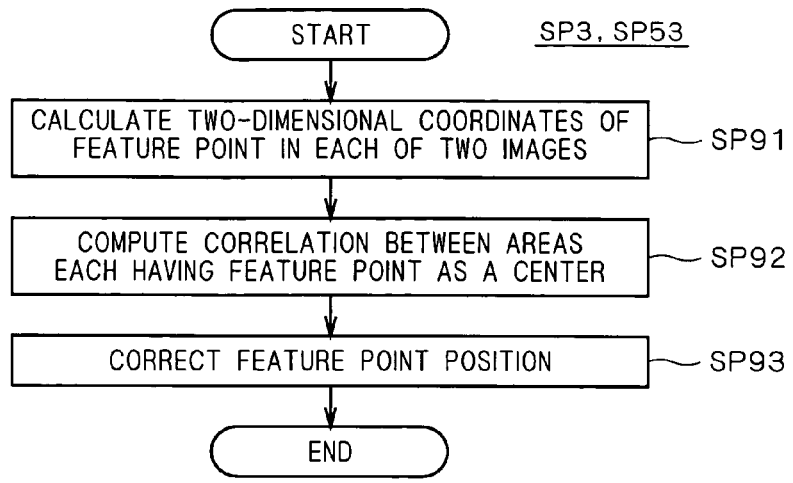
FIG. 24 is a flowchart showing replacing operation in a face part detecting step.
Figure 25:
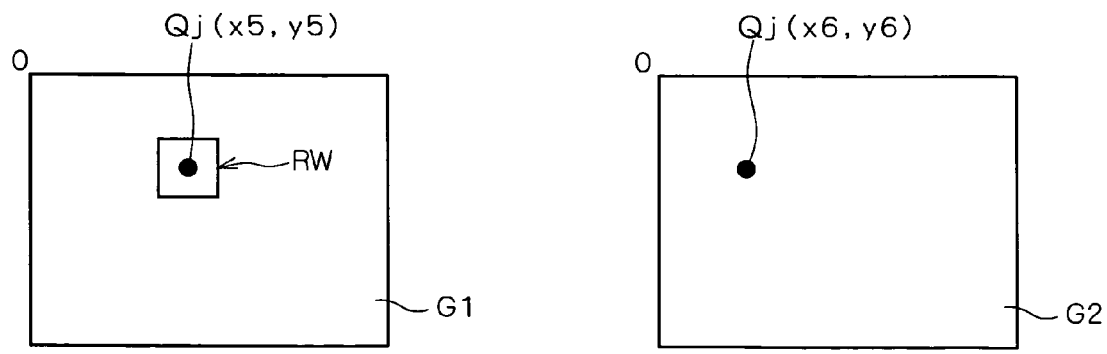
FIG. 25 is a diagram showing corresponding feature points in obtained two images.

By replacing the step SP3 (FIGS. 8 and 17) and the step SP53 (FIGS. 18 and 23) of the controllers 10a and 10b in the embodiments with a process shown in FIG. 24, the two-dimensional coordinates at the feature point Qj in a face calculated from each of two input images may be corrected by using the two images. FIG. 24 is a flowchart showing the replacing operation in the face part detecting steps SP3 and SP53, and FIG. 25 is a diagram showing the corresponding feature points Qj in the obtained two images.

Concretely, in step SP91 (FIG. 24), a process similar to that in the step SP3 is executed to calculate the two-dimensional coordinates at each of the feature points Qj in the two images.

Next, in step SP92, a process similar to that in the step SP74 (FIG. 20) is executed, and a correlation value in a predetermined area using the feature point Qj as a center is computed between the two images. Specifically, as shown in FIG. 25, a predetermined area RW (for example, an area having 5×5 pixels) having the feature point Qj on the image G1 as a center is cut out. While shifting the predetermined area RW by narrow width (for example, one pixel by one pixel) around the feature point Qj on the image G2, the correlation value is computed. The correlation value is calculated by using the equation (4) and the position in which the correlation value is the largest, that is, the area including the same part the most is specified.

In step SP93, a process similar to that in the step SP76 is executed, and the coordinates of the feature point Qj on the image G2 are corrected. Specifically, the correction is made to set the center position in the predetermined area RW in the position (coordinates) where the correlation value is the largest on the image G2 to the position of the two-dimensional coordinates of the feature point Qj on the image G2.

By correcting the two-dimensional position of each of the feature points Qj by the correlation value computation using texture information as described above, accurate calculation of the three-dimensional coordinates $Ms^{(j)}$ of each of the feature points Qj and generation of accurate authentication information can be realized.

Although the reliability evaluation value $H^{(j)}$ of the three-dimensional coordinates of each of the feature points is calculated by using the correlation value $F^{(j)}$ between corresponding areas in two images, the invention is not limited to the case. For example, the reliability evaluation value $H^{(j)}$ of the three-dimensional coordinates of each of the feature points can be calculated on the basis of the following elements (FA1 and FA2).

FA1 (Contrast Value)

When the contrast value in two images is high, it is easily specify a feature point in the steps SP3 and SP53. On the basis of such a property, the reliability of the three-dimensional coordinates at each feature point can be evaluated.

Concretely, a contrast value $FC^{(j)}$ in each of corresponding areas in two images is calculated. On the basis of an average value of the contrast values $FC^{(j)}$ in the corresponding areas, the reliability evaluation value $H^{(j)}$ of the three-dimensional coordinates at each feature point may be calculated. As the contrast value $FC^{(j)}$, a value obtained by accumulating differential absolute values of brightness values in adjacent pixels can be used.

FA2 (Distance from the Cameras CA1 and CA2 to Feature Point)

By using a property such that measurement accuracy in three-dimensional measurement using stereoscopic images is proportional to the inverse number of the square of the distance from the camera to the subject, the reliability of three-dimensional coordinates at each feature point can be evaluated.

Concretely, it is sufficient to calculate distances $Df1^{(j)}$ and $Df2^{(j)}$ from the two cameras CA1 and CA2 that capture two images to each of the feature points by using the fact that the three-dimensional coordinates at each feature point are calculated from the two images by the principle of triangulation, and calculate the reliability evaluation value $H^{(j)}$ on the basis of the distances to the feature points. More specifically, it is sufficient to use, as the reliability evaluation value $H^{(j)}$ of the three-dimensional coordinates at each feature point, a function $DF^{(j)}$ expressed by the equation (18) including, as elements, an average distance $Df^{(j)}$ obtained by averaging the distances $Df1^{(j)}$ and $Df2^{(j)}$ from the two cameras CA1 and CA2 to each of the feature points, and base length BL between the two cameras. The distances $Df1^{(j)}$ and $Df2^{(j)}$ from the cameras to each feature point can be calculated by using the three-dimensional position of the camera based on the camera parameters and three-dimensional coordinates at each feature points.

$$H^{(j)} = DF^{(j)} = \frac{BL}{(Df^{(j)})^2} \tag{18}$$

Although information included in the face information (corrected face information) is used as the corrected three-dimensional coordinates $Mm^{(j)}$ at each feature point of the face in the foregoing embodiment, the invention is not limited to the embodiment. Concretely, the face information (corrected face information) may include texture information of each area using the feature point Qj as a vertex in the face captured on the basis of stereo images (measurement information).

By including the texture information (two-dimensional information) in the face information, the model perfection level Hp may be calculated on the basis of reliability of the two-dimensional information (texture information).

For example, the ratio HT of giving texture information mapped to each area (patch) on an individual model (also called "texture giving ratio") can be used as the model perfection level Hp of the individual model. Specifically, the texture giving ratio HT becomes higher when images captured at various angles are obtained. It is considered that an individual model having the high texture giving ratio HT is generated on the basis of a number of stereo images. Consequently, it can be said that the reliability of data of the individual model having the high texture giving ratio is high.

The texture giving ratio HT is expressed as the following equation (19) using the total number PA of patches on an individual model, and the number PH of patches to which texture information is actually given.

$$Hp = PH/PA \tag{19}$$

The model perfection level Hp calculated on the basis of the texture giving ratio of the individual model can be also expressed as an evaluation value indicative of reliability of texture information (two-dimensional information) extracted from the individual model in steps SP11 and SP61.

The authentication systems 1A and 1B may use both model perfection level in which reliability of texture information is reflected (also called "two-dimensional model perfection level") and model perfection level in which reliability of the three-dimensional shape information is reflected (also called "three-dimensional model perfection level"). Consequently, in the process of updating the registrant information EC1 (steps SP15 to SP18 and steps SP65 to SP68) performed after end of the authentication determination, the process of updating the feature information based on the two-dimensional information (local two-dimensional face feature amount $d^{(k)}$) and the process of updating the feature information based on the three-dimensional shape information (three-dimensional shape feature amount $d^S$) can be performed separately. That is, by comparing the two model perfection levels (the two-dimensional model perfection level and the three-dimensional model perfection level) included in the registrant information EC1 of the person to be compared with the two model perfection levels included in the information EC2 of the person to be authenticated, the feature information based on the two-dimensional information and the feature information based on the three-dimensional information can be updated separately. Each time the authentication determination is executed, the authentication information of higher accuracy can be assured efficiently.

In the embodiment, the model perfection level Hp of the individual model is calculated by accumulating, in time series, the reliability evaluation values $H^{(j)}$ of the three-dimensional coordinates at the feature points of stereo images. The invention is not limited to the embodiment. Concretely, it is also possible to calculate an average value of the reliability evaluation values $H^{(j)}$ at the feature points in stereo images and calculate the model perfection level Hp of an individual model by using the average value.

Alternatively, the model perfection level Hp of an individual model in which dispersion of the reliability evaluation values $H^{(j)}$ at the feature points are also considered may be calculated. Specifically, the model perfection level Hp is calculated by using a method such that a standard deviation $SD^{(j)}$ of the reliability evaluation values $H^{(j)}$ at the feature points is calculated and, when the standard deviation $SD^{(j)}$ increases, the model perfection level Hp of the individual model deteriorates. Consequently, when the reliability evaluation values $H^{(j)}$ at feature points have dispersion, in other words, when a predetermined number of face images of low reliability are included in measurement information which is repeatedly input, the model perfection level Hp can be calculated so as to be low.

Although the brightness value of each of pixels in a patch is used as two-dimensional information in the foregoing embodiments, the color tone of each patch may be used as the two-dimensional information.

Although the MDA method is used as a method of determining the transformation matrix A in step SP6 in the foregoing embodiment, the invention is not limited to the method. For example, the Eigenspace method (EM) for obtaining the projective space to increase the difference between the within-class variance and the between-class variance from a predetermined feature space may be used.

Although coincidence between the person to be authenticated and the person to be registered is determined by using not only three-dimensional shape information but also texture information as shown in the equation (16) in the embodiment, the invention is not limited to the determination but coincidence between the person to be authenticated and the person to be registered may be determined by using only the three-dimensional shape information. To improve the authentication accuracy, it is preferable to use also the texture information.

Although the three-dimensional shape information of a face is obtained by using a plurality of images input from a plurality of cameras in the embodiment, the invention is not limited to the embodiment. Concretely, three-dimensional shape information of the face of a person to be authenticated may be obtained by using a three-dimensional shape measuring device constructed by a laser beam emitter L1 and a camera LCA as shown in FIG. 26 and measuring reflection light of a laser beam emitted from the laser beam emitter L1 by the camera LCA. However, by a method of obtaining three-dimensional shape information with an input device including two cameras as in the foregoing embodiment, as compared with an input device using a laser beam, three-dimensional shape information can be obtained with a relatively simpler configuration.

Although the person information storage 34 of the controller 10a and the person information storage 34 of the controller 10b are constructed as different members in the embodiment, the invention is not limited to the configuration. For example, a single storage may be shared.

Although the standard model of a face is obtained from the three-dimensional model database 32 in the controller 10a (10b) in the embodiment, the invention is not limited to the configuration. For example, the standard model of a face may be obtained from a model storage provided on the outside of the controller 10a (10b) via a network such as LAN and the Internet.

While the invention has been shown and described in detail, the foregoing description is in all aspects illustrative and not restrictive. It is therefore understood that numerous modifications and variations can be devised without departing from the scope of the invention.

What is claimed is:

1. An electronic authentication system comprising:
two cameras configured to take two face images of a first person at the same time;
a controller, said controller including:
a generator configured to generate face information including three-dimensional shape information in the face of the first person to be authenticated on the basis of measurement information of the first person, said measurement information being obtained by using the principal of triangulation from corresponding feature points between the two face images of the first person;
a first calculator configured to calculate a correlation value based on the inverse of an average differential absolute value of luminance values between at least two of the corresponding feature points in the two face images;
a model modifier configured to modify a standard model of a human face by using the face information, thereby generating an individual model of the face of the first person;
a second calculator configured to calculate a first model perfection level as a perfection level of the individual model on the basis of reliability of the face information, the perfection level being calculated using the correlation value;
an extractor configured to extract first feature information as feature information of the first person from the individual model;
an obtainer configured to obtain second feature information stored in said controller as pre-registered feature information of a second person to be compared with the first feature information;
an authenticator configured to perform an authenticating operation on the first person by using the first model perfection level in addition to similarity between the first feature information and the second feature information; and
a camera controller configured to take the two face images by the two cameras repeatedly until the correlation value necessary for a required authentication accuracy is obtained.

2. The authentication system according to claim 1, wherein the face information is updated on the basis of measurement information sequentially obtained at different time points.

3. The authentication system according to claim 2, wherein the model modifier updates the individual model each time the face information is updated.

4. The authentication system according to claim 1, wherein when the first model perfection level is lower than a predetermined value, the authenticator does not determine that the first person and the second person are the same person.

5. The authentication system according to claim 4, wherein the predetermined value is set according to an authentication level requested for the authenticating operation.

6. The authentication system according to claim 1, wherein the authenticator executes similarity calculating operation for calculating the similarity on condition that the first model perfection level exceeds a predetermined value.

7. The authentication system according to claim 1, wherein the authenticator executes operation of extracting the first feature information from the individual model on condition that the first model perfection level exceeds a predetermined value.

8. The authentication system according to claim 1, wherein the controller further comprises:
    a perfection level obtainer configured to obtain a second model perfection level as a perfection level of a model of the second person;
    a comparer configured to compare the first model perfection level with the second model perfection level; and
    an updater configured to update and register the first feature information as feature information of the second person when the authenticator determines that the first person and the second person are the same person and the comparer determines that the first model perfection level is higher than the second model perfection level.

9. The authentication system according to claim 8, wherein each of the first model perfection level and the second model perfection level includes a three-dimensional model perfection level of three-dimensional shape information and a two-dimensional model perfection level of two-dimensional information,
    each of the first feature information and the second feature information includes feature information based on the three-dimensional shape information and feature information based on the two-dimensional information,
    in comparison between the first model perfection level and the second model perfection level, the comparer separately executes first comparison between the three-dimensional model perfection level of the first model perfection level and the three-dimensional model perfection level of the second model perfection level and second comparison between the two-dimensional model perfection level of the first model perfection level and the two-dimensional model perfection level of the second model perfection level, and
    the updater updates the feature information based on the three-dimensional shape information on the basis of the first comparison and updates the feature information based on the two-dimensional information on the basis of the second comparison.

10. The authentication system according to claim 1, wherein the first model perfection level is calculated by accumulating the correlation values of the measurement information sequentially obtained at different time points.

11. The authentication system according to claim 10, wherein the first model perfection level is calculated by further adding the correlation values accumulated at all of the feature points.

12. An electronic registration system for registering information for face authentication, comprising:
    two cameras configured to take two face images of a first person at the same time;
    a controller, said controller comprising:
    a generator configured to generate face information including three-dimensional shape information in the face of the first person to be authenticated on the basis of measurement information of the first person, said measurement information being obtained by using the principal of triangulation from corresponding feature points between two face images of the first person;
    a first calculator configured to calculate a correlation value based on the inverse of an average differential absolute value of luminance values between at least two of the corresponding feature points in the two face images;
    a model modifier configured to modify a standard model of a human face by using the face information, thereby generating an individual model of the face of the first person;
    a second calculator configured to calculate a first model perfection level as a perfection level of the individual model on the basis of reliability of the face information, the perfection level being calculated using the correlation value;
    an extractor configured to extract feature information of the first person from the individual model;
    a registry configured to register the model perfection level and the feature information as the information for face authentication; and
    a camera controller configured to take the two face images by the two cameras repeatedly until the correlation value necessary for a required authentication accuracy is obtained.

13. The registration system according to claim 12, wherein the face information is updated on the basis of measurement information sequentially obtained at different time points.

14. A computer software program stored on a non-transitory computer readable medium for causing a computer to execute a method comprising:
    a generating step of generating face information including three-dimensional shape information in the face of the first person to be authenticated on the basis of measurement information of the first person, said measurement information being obtained by using the principal of triangulation from corresponding feature points between two face images of the first person;
    a first calculating step for calculating a correlation value based on the inverse of an average differential absolute value of luminance values between at least two of the corresponding feature points in the two face images;
    a model modifying step of modifying a standard model of a human face by using the face information, thereby generating an individual model of the face of the first person;
    a second calculating step of calculating a first model perfection level as a perfection level of the individual model on the basis of reliability of the face information, the perfection level being calculated using the correlation value;
    an extracting step of extracting first feature information as feature information of the first person from the individual model;

an obtaining step of obtaining second feature information stored in said computer as preregistered feature information of a second person to be compared with the first feature information;

an authenticating step of performing an authenticating operation on the first person by using the first model perfection level in addition to similarity between the first feature information and the second feature information; and a controlling step of causing the two face images to be repeatedly acquired until the correlation value necessary for a required authentication accuracy is obtained.

15. A controller for authenticating facial feature information, said controller comprising:

a memory; and a computer processor programmed to perform the steps of:

generating face information including three-dimensional shape information in the face of a first person to be authenticated on the basis of measurement information of the first person, said measurement information being triangulation data from corresponding feature points between two face images of the first person taken simultaneously by two cameras;

calculating a correlation value based on the inverse of an average differential absolute value of luminance values between at least two of the corresponding feature points in the two face images;

modifying a standard model of a human face by using the face information, thereby generating an individual model of the face of the first person;

calculating a first model perfection level as a perfection level of the individual model on the basis of reliability of the face information, the perfection level being obtained from the correlation value;

extracting first feature information as feature information of the first person from the individual model;

obtaining second feature information stored in said controller as pre-registered feature information of a second person to be compared with the first feature information;

performing an authenticating operation on the first person by using the first model perfection level in addition to similarity between the first feature information and the second feature information; and causing the two face images to be repeatedly acquired until the correlation value necessary for a required authentication accuracy is obtained.

16. A controller for registering facial feature information, comprising:

a memory; and a computer processor programmed to perform the steps of:

generating face information including three-dimensional shape information in the face of a first person to be authenticated on the basis of measurement information of the first person, said measurement information being triangulation data from corresponding feature points between two face images of the first person taken simultaneously by two cameras;

calculating a correlation value based on the inverse of an average differential absolute value of luminance values between at least two of the corresponding feature points in the two face images;

modifying a standard model of a human face by using the face information, thereby generating an individual model of the face of the first person;

calculating a model perfection level as a perfection level of the individual model on the basis of reliability of the face information, the perfection level being obtained from the correlation value;

extracting feature information of the first person from the individual model;

causing the two face images to be repeatedly acquired until the correlation value necessary for a required authentication accuracy is obtained; and registering the model perfection level and the feature information as the information for face authentication.

17. An electronic authentication system comprising:

two cameras configured to take two face images of a first person each other at the same time; and a controller, said controller including:

a generator configured to generate face information including three-dimensional shape information in the face of the first person to be authenticated on the basis of measurement information of the first person, said measurement information being obtained by using the principal of triangulation from corresponding feature points between the two face images of the first person;

a first calculator configured to calculate a correlation value based on the inverse of an average differential absolute value of luminance values between at least two of the corresponding feature points in the two face images;

a model modifier configured to modify a standard model of a human face by using the face information, thereby generating an individual model of the face of the first person;

an extractor configured to extract first feature information as feature information of the first person from the individual model;

an obtainer configured to obtain second feature information stored in said controller as pre-registered feature information of a second person to be compared with the first feature information;

an authenticator configured to perform an authenticating operation on the first person by using the first model perfection level in addition to similarity between the first feature information and the second feature information; and a camera controller configured to take the two face images by the two cameras repeatedly until the correlation value necessary for a required authentication accuracy is obtained.

* * * * *